United States Patent
Nishihara

(10) Patent No.: US 8,208,053 B2
(45) Date of Patent: Jun. 26, 2012

(54) IMAGING DEVICE, CAMERA, CONTROL METHOD FOR IMAGING DEVICE, AND COMPUTER PROGRAM

(75) Inventor: Toshiyuki Nishihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 433 days.

(21) Appl. No.: 12/457,680

(22) Filed: Jun. 18, 2009

(65) Prior Publication Data

US 2010/0007780 A1    Jan. 14, 2010

(30) Foreign Application Priority Data

Jul. 9, 2008  (JP) ................. 2008-178964

(51) Int. Cl.
*H04N 9/64* (2006.01)
*H04N 3/14* (2006.01)
*H04N 5/335* (2011.01)
(52) U.S. Cl. ............ 348/297; 348/245; 348/308
(58) Field of Classification Search .......... 348/245
See application file for complete search history.

(56) References Cited

U.S. PATENT DOCUMENTS

| | | | | |
|---|---|---|---|---|
| 5,872,596 A * | 2/1999 | Yanai et al. | | 348/297 |
| 6,665,010 B1 * | 12/2003 | Morris et al. | | 348/297 |
| 6,977,685 B1 * | 12/2005 | Acosta-Serafini et al. | | 348/308 |
| 7,068,315 B1 * | 6/2006 | Suzuki et al. | | 348/308 |
| 7,158,180 B2 * | 1/2007 | Neidrich | | 348/340 |
| 7,548,689 B2 * | 6/2009 | Yap et al. | | 396/234 |
| 2003/0020827 A1 * | 1/2003 | Bean et al. | | 348/363 |
| 2005/0151866 A1 * | 7/2005 | Ando et al. | | 348/297 |
| 2005/0264666 A1 * | 12/2005 | Iwasawa et al. | | 348/308 |
| 2006/0098108 A1 | 5/2006 | Kurosawa | | |
| 2006/0181625 A1 * | 8/2006 | Han et al. | | 348/297 |
| 2007/0273785 A1 * | 11/2007 | Ogawa et al. | | 348/362 |
| 2008/0291290 A1 * | 11/2008 | Sonoda et al. | | 348/222.1 |
| 2008/0297627 A1 * | 12/2008 | Matsuda | | 348/243 |

FOREIGN PATENT DOCUMENTS

JP    2005-051352    2/2005
JP    2006-135708    5/2006

* cited by examiner

*Primary Examiner* — Sinh Tran
*Assistant Examiner* — Jason Flohre
(74) *Attorney, Agent, or Firm* — Rader Fishman & Grauer, PLLC

(57) ABSTRACT

An imaging device includes: plural pixel blocks with a predetermined number of pixel circuits of respective plural blocks set as one unit, the plural blocks being obtained by dividing a pixel area formed by arraying plural pixel circuits, which convert incident light into charges according to photoelectric conversion, in a matrix shape; and a selection control unit that selects desired ones of the pixel blocks and collectively executes reset control for discharging charges accumulated by the respective pixel circuits in the selected pixel blocks, wherein the selection control unit changes timing for executing the reset control for each of the selected pixel blocks and allocates different charge accumulating times to the pixel circuits.

8 Claims, 15 Drawing Sheets

IMAGING DEVICE, CAMERA, CONTROL METHOD FOR IMAGING DEVICE, AND COMPUTER PROGRAM

BACKGROUND OF THE INVENTION

1. Field of the Invention

The present invention relates to an imaging device such as a CMOS (Complementary Metal Oxide Semiconductor) image sensor, a camera, a control method for the imaging device, and a computer program.

2. Description of the Related Art

A digital camera (hereinafter simply referred to as camera) mounted with a CMOS image sensor or the like in the past performs processing explained below in exposure control. First, the camera calculates illuminance (brightness) on a screen of a subject that should be imaged. As a method of calculating the illuminance, a method of integrating a luminance level included in an output signal of a pixel circuit over an entire pixel area is widely used.

Thereafter, the camera adjusts a gain, a stop value, and timing for an electronic shutter (also referred to as reset of the pixel circuit) according to this measured illuminance to thereby perform exposure control.

In an extremely dark place, the camera performs adjustment for fully opening a stop and executing the electronic shutter such that charge accumulating time of the pixel circuit is maximized, thereby increasing the gain. As the illuminance increases, the camera performs adjustment for decreasing the gain to 0 and adjusting the timing of the electronic shutter to reduce the charge accumulating time. In an extremely bright place, the camera performs processing for fixing the electronic shutter to close the stop.

As related arts, there are JP-A-2005-51352 and JP-A-2006-135708.

SUMMARY OF THE INVENTION

As explained above, the exposure control corresponding to the illuminance is performed. In particular, most of cameras in recent years automatically perform exposure control corresponding to various photographing modes from a viewpoint of user friendliness. In such cameras, when an extremely bright area and an extremely dark area are mixed in one screen, appropriate exposure control is not performed and it is difficult to obtain an optimum pickup image.

To solve this problem, if the camera sets an exposure amount large, charges accumulated by a pixel circuit in a bright area exceed a charge amount that can be accumulated. Therefore, a phenomenon such as white void occurs. Conversely, if the camera sets an exposure amount small, it is difficult to discriminate a dark area because the dark area is hidden by noise.

This is because charge accumulating times of respective pixel circuits are the same in all pixel areas and, in exposure control, the camera calculates the illuminance of an entire screen and applies the exposure control to the entire screen.

In any case, the cameras in the past including those disclosed by JP-A-2005-51352 and JP-A-2006-135708 can only adjust the timing for the gain, the stop value, and the electronic shutter uniformly over the entire screen. Therefore, it is difficult to prevent such a problem.

Therefore, it is desirable to provide an imaging device, a camera, a control method for the imaging device, and a computer program that can expand a dynamic range and acquire an optimum pickup image even when extreme light and shade occurs in one screen.

According to an embodiment of the present invention, there is provided an imaging device including: plural pixel blocks with a predetermined number of pixel circuits of respective plural blocks set as one unit, the plural blocks being obtained by dividing a pixel area formed by arraying plural pixel circuits, which convert incident light into charges according to photoelectric conversion, in a matrix shape; and a selection control unit that selects desired ones of the pixel blocks and collectively executes reset control for discharging charges accumulated by the respective pixel circuits in the selected pixel blocks. The selection control unit changes timing for executing the reset control for each of the selected pixel blocks and allocates different charge accumulating times to the pixel circuits.

Preferably, the selection control unit allocates the charge accumulating times to be short as illuminance calculated from luminance of each of the pixels blocks rises.

Preferably, the pixel circuits respectively include transfer switches for transferring accumulated charges to predetermined nodes, the selection control unit includes, one for each of the pixel blocks, switch circuits for executing reset control on the pixel circuit in the selected pixel block, the switch circuits are arranged in the same column and connected to first and second control lines for controlling states of the switch circuits to be on or off, and the selection control unit simultaneously switches, on the basis of a first control signal supplied to the first control line and a second control signal supplied to the second control line, all the transfer switches of the pixel circuits in the pixel blocks.

Preferably, each of the pixel blocks is formed by N×N (N=2, 3, . . . ) pieces of the pixel circuits such that the pixel block is formed in a substantial regular square shape.

Preferably, the first control line is divided into N lines, the reset control circuits are dispersed in different positions for each row in the same pixel blocks and connected to any one of the divided first control lines, and the selection control unit supplies the first control signal to the N first control lines and collectively executes reset control for the pixel circuits in the pixel blocks.

Preferably, the pixel area includes a light blocking area for blocking the incident light, and the pixel blocks are formed in line units in the light blocking area.

The pixel area includes a light blocking area for blocking the incident light, and the selection control unit allocates, to the light blocking area, longest charge accumulating time among the charge accumulating times to be allocated.

According to another embodiment of the present invention, there is provided a camera including: an imaging device; an optical system that guides incident light to a pixel area of the imaging device; a control unit that controls the imaging device; and a signal processing unit that processes an output signal output by the imaging device on the basis of the control. The imaging device includes: plural pixel blocks with a predetermined number of pixel circuits of respective plural blocks set as one unit, the plural blocks being obtained by dividing a pixel area formed by arraying plural pixel circuits, which convert incident light into charges according to photoelectric conversion, in a matrix shape; and a selection control unit that selects desired ones of the pixel blocks and collectively executes reset control for discharging charges accumulated by the respective pixel circuits in the selected pixel blocks. The selection control unit changes timing for executing the reset control for each of the selected pixel blocks and allocates different charge accumulating times to the pixel circuits.

According to still another embodiment of the present invention, there is provided a control method for an imaging device including the steps of: dividing a pixel area formed by arraying plural pixel circuits, which convert incident light into charges according to photoelectric conversion, in a matrix shape and selecting desired ones of the pixel blocks among plural pixel blocks with a predetermined number of pixel circuits of the respective plural blocks set as one unit; and collectively executing reset control for discharging charges accumulated by the respective pixel circuits in the selected pixel blocks. In the step of collectively executing the reset control, timing for executing the reset control is changed for each of the selected pixel blocks and different charge accumulating times are allocated to the pixel circuits.

According to still another embodiment of the present invention, there is provided a computer program for causing a computer to execute: first processing for dividing a pixel area formed by arraying plural pixel circuits, which convert incident light into charges according to photoelectric conversion, in a matrix shape and selecting desired ones of the pixel blocks among plural pixel blocks with a predetermined number of pixel circuits of the respective plural blocks set as one unit; and second processing for collectively executing reset control for discharging charges accumulated by the respective pixel circuits in the selected pixel blocks. In the second processing, timing for executing the reset control is changed for each of the selected pixel blocks and different charge accumulating times are allocated to the pixel circuits.

According to the embodiments, a pixel area is divided into plural blocks, and the selection control unit collectively executes, in pixel block units, reset control for discharging charges accumulated by the pixel circuits in the pixel blocks. The selection control unit selects desired pixel blocks, changes timing for reset control for each of the selected pixel blocks, and allocates different charge accumulating times to the pixel circuits.

According to the embodiments, even when extreme light and shade occurs in one screen, it is possible to expand a dynamic range and acquire an optimum pickup image.

DESCRIPTION OF THE PREFERRED EMBODIMENTS

Embodiments of the present invention are explained in detail below with reference to the accompanying drawings.
First Embodiment In a first embodiment of the present invention, a camera in which a pixel area is divided into plural pixel blocks (areas) and exposure control can be executed for each of the pixel blocks is explained. A CMOS image sensor that can collectively control only pixel circuits in desired pixel blocks in executing exposure control for each of the pixel blocks is mounted on the camera.

First, the CMOS image sensor is explained in detail.

Figure 1:
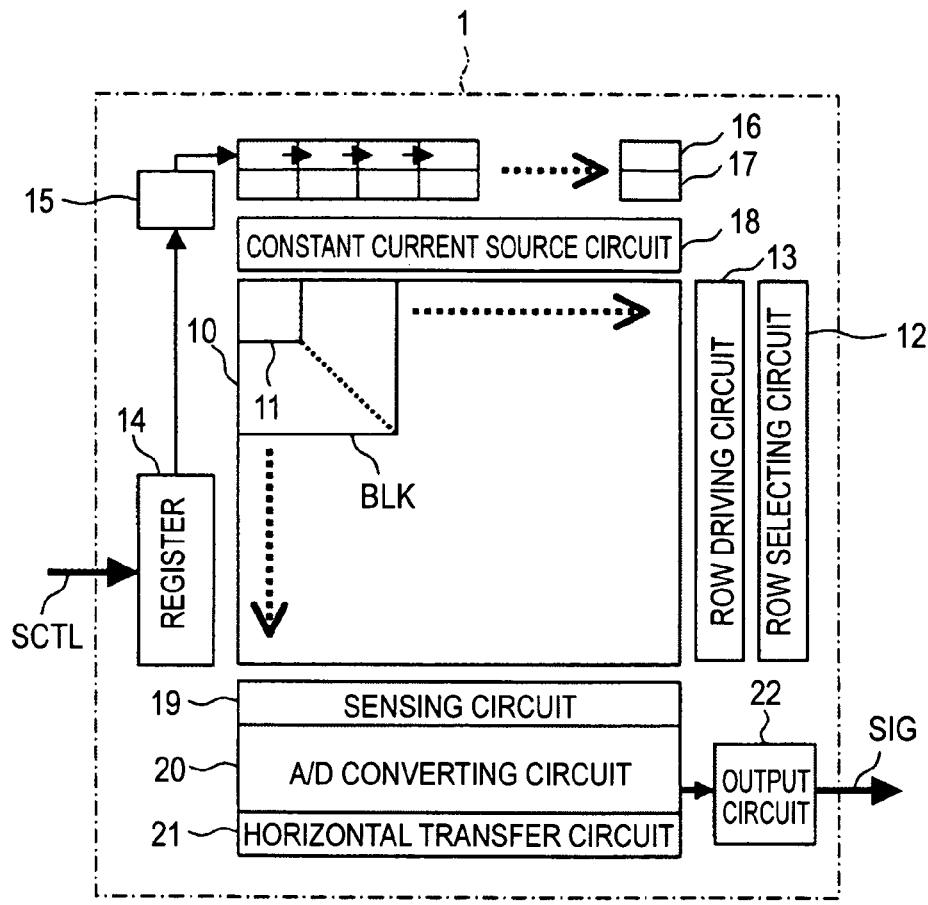
FIG. 1 is a schematic diagram of a configuration example of a CMOS image sensor according to a first embodiment of the present invention.

FIG. 1 is a schematic diagram of a configuration example of the CMOS image sensor according to the first embodiment.

Figure 2:
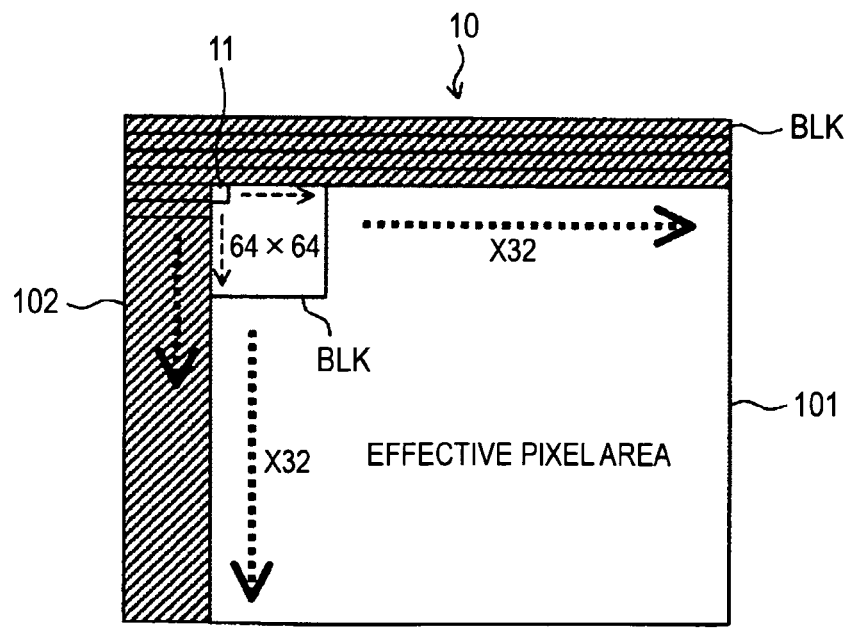
FIG. 2 is a schematic diagram of a configuration example of a pixel unit according to the first embodiment.

FIG. 2 is a schematic diagram of a configuration example of a pixel unit according to the first embodiment.

As shown in FIG. 1, a CMOS image sensor 1 as an imaging device includes a pixel unit 10, plural pixel circuits 11, a row selection circuit 12, a row driving circuit 13, a register 14, a pixel-block control circuit 15, a shift register group 16, a reset control circuit 17, a constant current source circuit 18, a sensing circuit 19, an A/D converting circuit 20, a horizontal transfer circuit 21, and an output circuit 22.

A selection control unit according to the first embodiment includes the row driving circuit 13, the pixel-block control circuit 15, the shift register 16, the reset control circuit 17, and a switch circuit SW explained later.

The pixel unit 10 is also referred to as a pixel area. As shown in FIG. 2, the pixel unit 10 includes an effective pixel area 101 and a light blocking area 102 indicated by hatching in FIG. 2.

The effective pixel area 101 is an area for receiving incident light and occupies most of the pixel unit 10. In this area, for example, 2048 (row direction)×2048 (column direction) pixel circuits 11 are arrayed in a matrix shape.

The effective pixel area 101 is divided into 32×32 blocks in a matrix shape. According to this division, 32×32 pixel blocks BLK with 64×64 pixel circuits 11 set as one unit are formed in the effective pixel area 101.

It is desirable to divide the effective pixel area 101 to form the respective pixel blocks BLK in a substantial regular square shape, i.e., to set n (n=2, 3, . . . )×n pixel circuits 11 as one unit. This is because when the pixel blocks gather on one side vertically or horizontally, unnatural noise such as a vertical streak or a horizontal streak mixes in a pickup image.

The light blocking area 102 is an area in which incident light is blocked. The area is formed in a part of the pixel unit 10 to extend along two sides of the effective pixel area 101.

The light blocking area 102 is provided to reduce generated dark current noise. The dark current noise is noise caused by unnecessary charges (so-called dark current) accumulated by heat or a crystal defect that occurs in the pixel circuits 11.

A camera control unit 32 (see FIG. 6) on the outside of the CMOS image sensor 1 explained later measures dark current noise using a dark current caused by the pixel circuits 11 in the light blocking area 102 and reduces the dark current noise by deducting the dark current noise from image data.

The light blocking area 102 is not divided into blocks in a column direction and is divided in row units. The light blocking area 102 is divided in, for example, a unit of four rows (also referred to as lines) in a row direction. Specifically, 512 pixel blocks BLK with 512×m (m=1, 2, ...) pixel circuits 11 set as one unit are formed.

The respective pixel circuits 11 are covered with color filters corresponding to R (red), G (green), and B (blue) and arrayed in an array form of, for example, a Bayer type. The pixel circuits 11 convert incident light into charges (electrons) according to photoelectric conversion. However, the pixel circuits 11 in the light blocking area 102 are shielded from light, the pixel circuits 11 do not generate charges by the photoelectric conversion.

In order to scan the respective pixel circuits 11, the row selection circuit 12 sequentially outputs a row selection signal SAD to the row driving circuit 13 every time the row selection circuit 12 performs the scanning.

The row driving circuit 13 controls the pixel circuits 11 on the basis of the row selection signal SAD input from the row selection circuit 12.

A control signal SCTL input from the camera control unit 32 on the outside of the CMOS image sensor 1 is written in the register 14. The control signal SCTL includes, for example, data of the pixel block BLK that should be selected.

The pixel-block control circuit 15 reads out the control signal SCTL written in the register 14 and extracts, from the control signal SCTL, data concerning the pixel block BLK that should be selected. The pixel-block control circuit 15 determines, from the extracted data, the pixel block BLK that should be selected and outputs determined content to the shift register group 16 (a shift register 16(1)) as data S1.

In the shift register group 16, shift registers 16(1) to 16(2048) equivalent to the number of rows (in this embodiment, 2048) are provided in the row direction and the shift registers are connected in series. Respective shift registers 16(n) output the data S1 to the reset control circuit 17 and shift the input data S1 to the next stage in synchronization with a clock signal generated by a not-shown timing generator.

When the data S1 is input from the respective shift registers 16(n), the reset control circuit 17 supplies a pixel block selection signal SBS corresponding to the data S1 to a pixel block selection signal line BSL (see FIG. 3) corresponding thereto.

Figure 3:
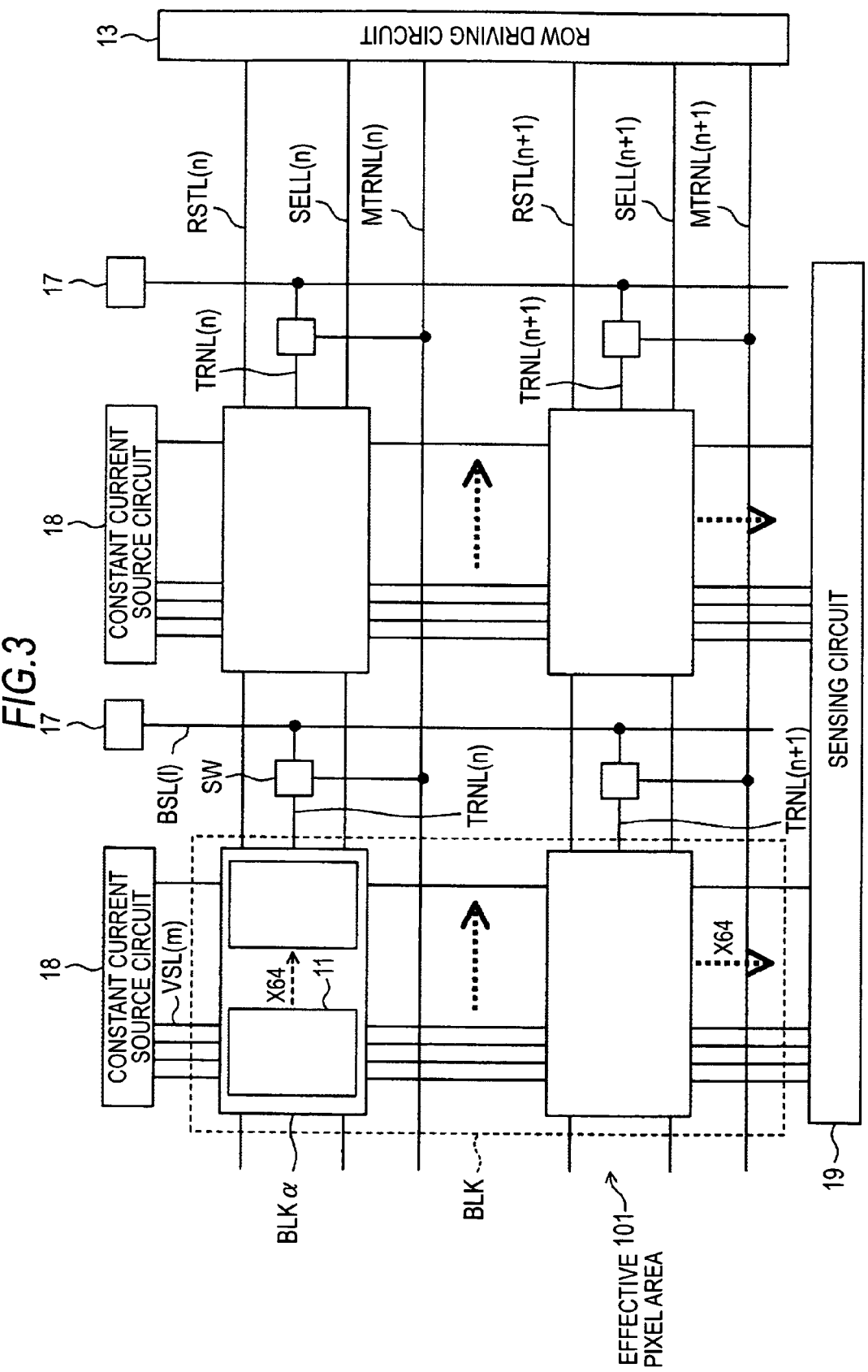
FIG. 3 is a detailed block diagram of the pixel unit according to the first embodiment.
Figure 4:
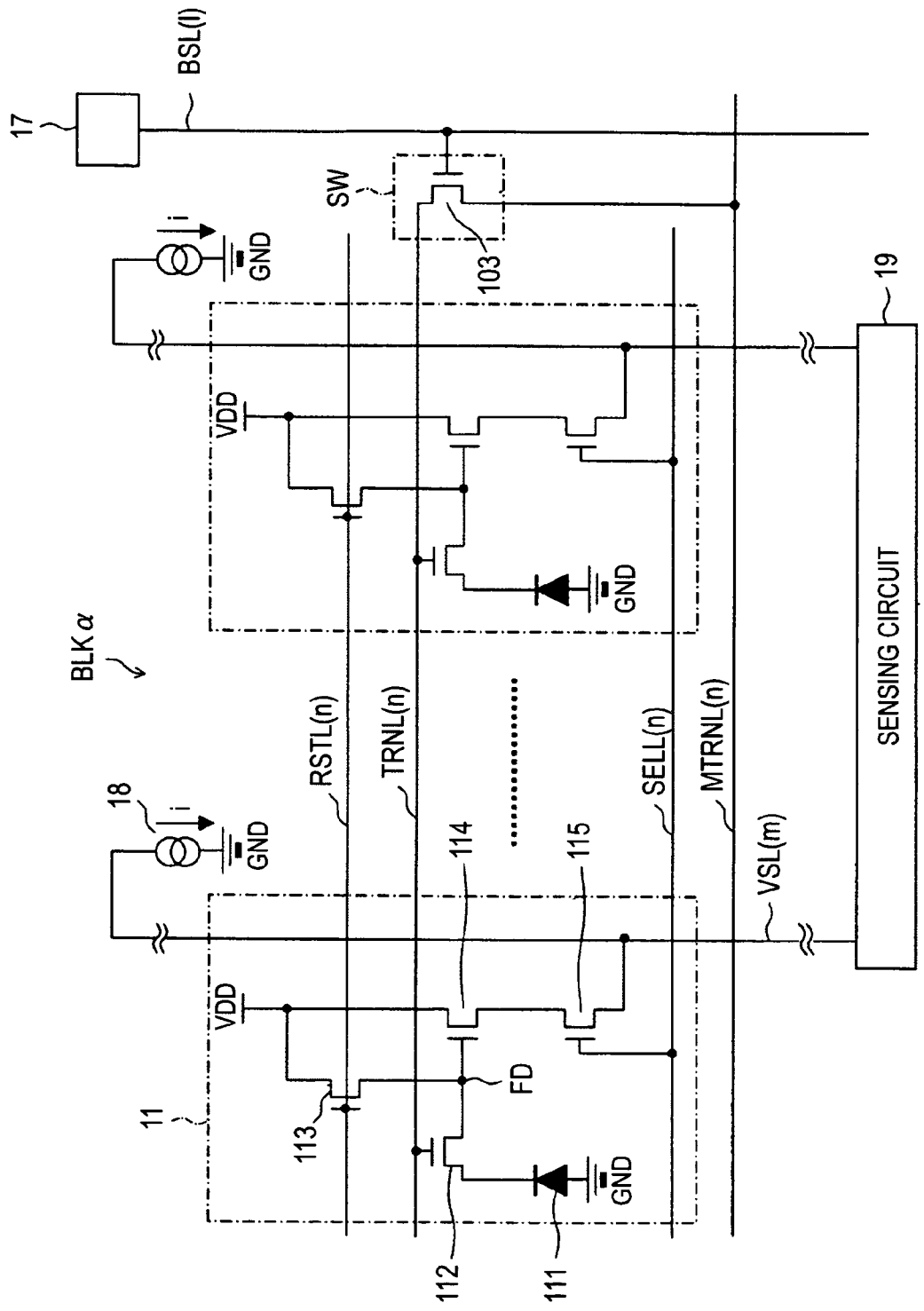
FIG. 4 is an equivalent circuit diagram of an example of a pixel circuit that forms a small pixel block according to the first embodiment.

The constant current source circuit 18 supplies a predetermined current i to vertical signal lines VSL(m) (see FIGS. 3 and 4).

In the sensing circuit 19, for example, a voltage comparator is connected to each of the vertical signal lines VSL(m) (see FIGS. 3 and 4). As explained in detail later, when the pixel circuits 11 read out charges, reset of the pixel circuits 11 is executed twice, whereby a voltage signal SIG is supplied to the vertical signal lines VSL(m) twice in each horizontal period. The sensing circuit 19 generates a difference (a difference of charges) between these two voltage signals SIG column by column and outputs a generated signal to the A/D converting circuit 20.

The A/D converting circuit 20 includes, for example, a counter and a memory. According to the difference between the voltage signals SIG sensed by the sensing circuit 19 column by column, the A/D converting circuit 20 converts, on the basis of the control by the horizontal transfer circuit 21, the voltage signal SIG of an analog format into the voltage signal SIG of a digital format column by column and outputs the digital voltage signal SIG to the horizontal transfer circuit 21.

The horizontal transfer circuit 21 sequentially selects, in synchronization with a not-shown clock signal, the counter, the memory, and the like included in the A/D converting circuit 20 column by column. When the digital voltage signal SIG is input from the A/D converting circuit 20, the horizontal transfer circuit 21 sequentially outputs the voltage signal SIG to the output circuit 22.

Figure 6:
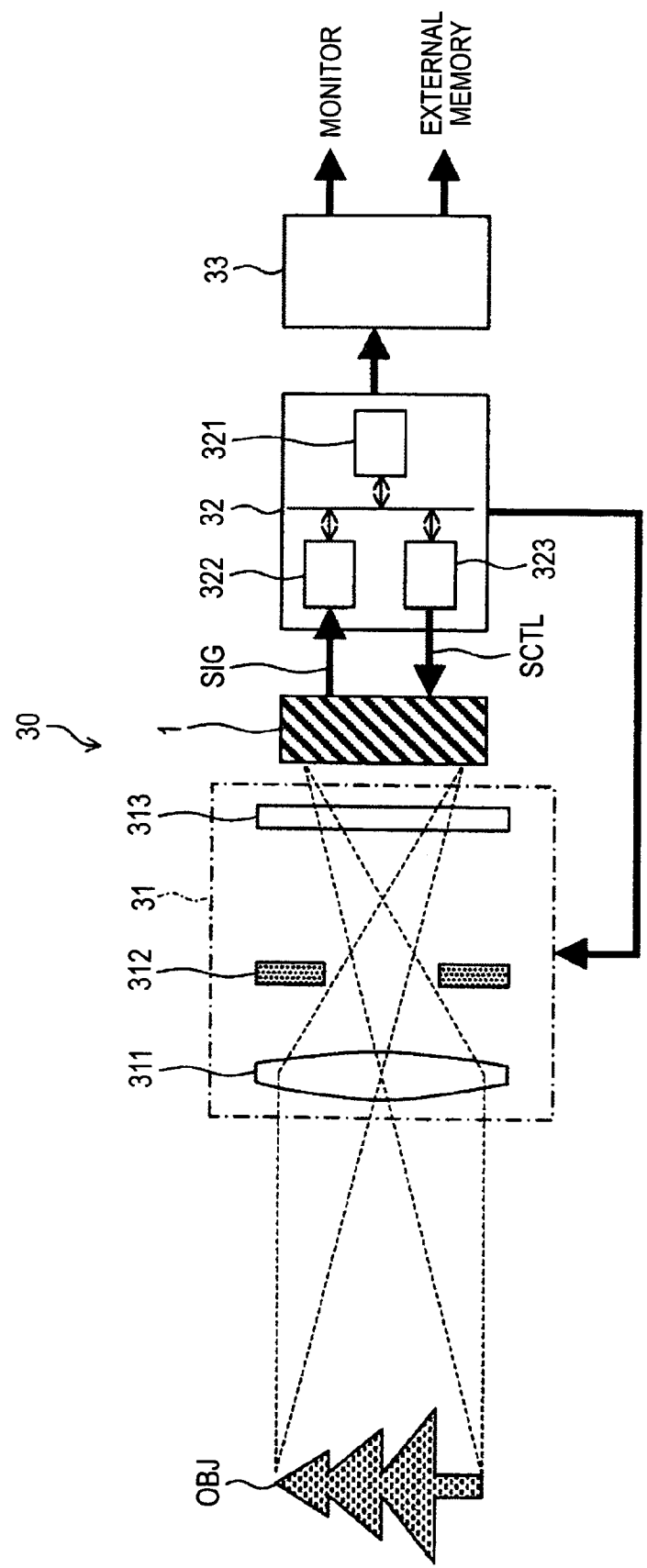
FIG. 6 is a block diagram of a configuration example of a camera mounted with the CMOS image sensor according to the first embodiment.

The output circuit 22 amplifies the voltage signal SIG input from the horizontal transfer circuit 21 and outputs the amplified voltage signal SIG to the camera control unit 32 (see FIG. 6).

A detailed configuration of the pixel unit 10 is explained with reference to FIG. 3.

FIG. 3 is a detailed block diagram of a configuration example of the pixel unit according to the first embodiment.

In the effective pixel area 101, 32×32 pixel blocks BLK are formed. One pixel block BLK is formed by 64×64 pixel circuits 11 to have a substantial regular square shape. Only two pixel blocks BLK are shown in FIG. 3.

A small pixel block BLKα shown in FIG. 3 is a pixel block formed by collecting continuous sixty-four pixel circuits 11 arrayed in an nth row. Therefore, one pixel block BLK is formed by continuous sixty-four small pixel blocks BLKα arrayed in the row direction. Only the small pixel blocks BLKα in the nth row and a (n+1)th row are shown in FIG. 3.

In the effective pixel area 101, 32×2048 small pixel blocks BLKα are present.

The pixel circuits 11 forming the small pixel blocks BLKα are explained.

FIG. 4 is an equivalent circuit diagram of an example of a pixel circuit forming a small pixel block according to the first embodiment.

As shown in FIG. 4, one pixel circuit 11 includes a photoelectric conversion element 111 formed by, for example, a photodiode, a transfer transistor 112 as a transfer switch, a reset transistor 113, an amplification transistor 114, and a selection transistor 115.

An anode side of the photoelectric conversion element 111 is grounded (GND) and a cathode side thereof is connected to a source of the transfer transistor 112. The photoelectric conversion element 111 photoelectrically converts incident light into charges (electrons) according to a light amount thereof and accumulates the charges. In the following explanation, the accumulation of charges by the photoelectric conversion element 111 is also referred to as "the pixel circuit accumulates charges". Time in which the photoelectric conversion element 111 accumulates charges is referred to as charge accumulating time.

As the respective transistors, an n-channel MOSFET (metal Oxide Semiconductor Field Effect Transistor) is adopted as an example. The respective transistors adopt a connection form explained below.

In order to transfer the charges accumulated by the photoelectric conversion element 111 to a floating diffusion FD serving as a node, the transfer transistor 112 is provided between the cathode side of the photoelectric conversion element 111 and the floating diffusion FD. A transfer signal line WTRNL(n) is connected to a gate of the transfer transistor 112.

A drain of the transfer transistor 112, a source of the reset transistor 113, and a gate of the amplification transistor 114 are connected to the floating diffusion FD.

In order to reset the potential of the floating diffusion FD to power supply voltage VDD, the reset transistor 113 is provided between the floating diffusion FD and the power supply voltage VDD. A reset signal line RSTL(n) is connected to a gate of the reset transistor 113.

The amplification transistor 114, the constant current source circuit 18 connected to the amplification transistor 114 via the selection transistor 115, and the vertical signal line VSL(m) connected to the constant current source circuit 18 configure a source follower circuit. A drain of the amplification transistor 114 is connected to the power supply voltage VDD and a source thereof is connected to a drain of the selection transistor 115.

The drain of the selection transistor 115 is connected to a source of the amplification transistor 114 to be connected to the amplification transistor 114 in series, a gate thereof is connected to a selection signal line SELL(n), and a source thereof is connected to the vertical signal line VSL(m). The selection transistor 115 selectively outputs a voltage amplified by the amplification transistor 114 to the vertical signal line VSL(m).

The pixel circuits 11 explained above transfer the charges accumulated by the photoelectric conversion element 111 to the floating diffusion FD and performs "reset" for setting the potential of the floating diffusion FD to the power supply voltage VDD.

The reset of the potential of the floating diffusion FD to the power supply voltage VDD is also simply referred to as "reset" or "electronic shutter". Control concerning the reset is also referred to as reset control.

In order to perform the reset, it is necessary to supply a high-level signal to the reset signal line RSTL(n) and the transfer signal line TRNL(n) and apply voltage to the gates of the transfer transistor 112 and the reset transistor 113 to maintain both the transistors in an ON (energized) state.

After the execution of the reset, "readout of charges" for reading out the charges accumulated in the pixel circuits 11 is performed. In the "readout of charges", it is also necessary to maintain the transfer transistor 112 and the reset transistor 113 in the ON state.

Charge accumulating time is determined according to timing of the reset to be executed and timing of the readout of charges in one frame period. Therefore, as a time interval between the reset and the readout of charges is longer, the charge accumulating time is longer and exposure time is longer.

If gates of transfer transistors 112 in the nth row are connected in common to the transfer signal line TRNL(n), all the transfer transistors 112 connected to this signal line are collectively controlled. Therefore, it is difficult to selectively control only the pixel circuits 11 in desired pixel blocks BLK. In other words, it is difficult to uniformly control the exposure time (exposure control) in the entire pixel area.

Therefore, in the first embodiment, the gates of the transfer transistors 112 are connected in common to the transfer signal line TRNL(n) only in the small pixel block BLKα and the switch circuit SW is provided. This makes it possible to selectively execute the reset of the pixel circuits 11 and the readout of charges.

Specifically, as shown in FIG. 4, in the pixel circuits 11 in the small pixel block BLKα, gates of reset transistors 113 are connected in common by the reset signal line RSTL(n). Similarly, gates of selection transistors 115 are also connected in common by the selection signal line SELL(n). The transfer transistors 112 are also connected in common by the transfer signal line TRNL(n).

Referring to FIG. 3 again, in the nth row, the reset signal line RSTL(n) and the selection signal line SELL(n) are shared by the small pixel blocks BLKα. One ends thereof are connected to the row driving circuit 13.

However, unlike these signal lines, the transfer signal line TRNL(n) is not shared between the small pixel blocks BLKα and is shared only between the pixel circuits 11 in the small pixel blocks BLKα.

Transfer signal lines TRNL(n) of the small pixel blocks BLKα are connected to a main transfer signal line MTRNL(n) via switch circuits SW. One end of the main transfer signal line MTRNL(n) is connected to the row driving circuit 13.

The switch circuits SW are provided to collectively control to reset only the pixel circuits 11 in the small pixel blocks BLKα among the pixel circuits 11 in the effective pixel area 101. The switch circuits SW are explained below with reference to FIGS. 3 and 4.

As shown in FIG. 4, the switch circuit SW includes a transistor 103 functioning as a switch. As the transistor 103, for example, an n-channel MOSFET is adopted.

The gate of the transistor 103 is connected to a pixel block selection signal line BSL(l) (l=1, 2, . . . , and 32), the source thereof is connected to a transfer signal line TRNL(n), and the drain thereof is connected to the main transfer signal line MTRNL(n).

The pixel block selection signal line BSL(l) corresponds to a first control line described in claims and the main transfer signal line MTRNL(n) corresponds to a second control line described in claims.

The pixel block selection signal line BSL(l) is connected to the reset control circuit 17. The main transfer signal line MTRNL(n) is connected to the row driving circuit 13 (see FIG. 3).

As shown in FIG. 3, the switch circuit SW having the configuration explained above is provided for each of the small pixel blocks BLKα.

Only when the row driving circuit 13 supplies a high-level main driving signal SMTRN to the main transfer signal line MTRNL(n) and the reset control circuit 17 supplies a high-level pixel block selection signal SBS to the pixel block selection signal line BSL(l), the transistor 103 changes to the ON state, i.e., the switch circuit SW is turned on.

The pixel block selection signal SBS corresponds to a first control signal described in claims. The main driving signal SMTRN corresponds to a second control signal described in claims.

The high-level main driving signal SMTRN output by the row driving circuit 13 is supplied to the transfer signal line WTRNL(n) as a driving signal STRN.

Operations performed by the pixel circuits 11 when the first small pixel block BLKα in the nth row is selected are explained. For convenience of explanation, it is assumed that the small pixel block BLKα is present in the effective pixel area 101.

FIGS. 5A to 5F illustrates a timing chart of an operation example performed by the pixel circuits when an arbitrary small pixel block according to the first embodiment is selected.

Figure 5:
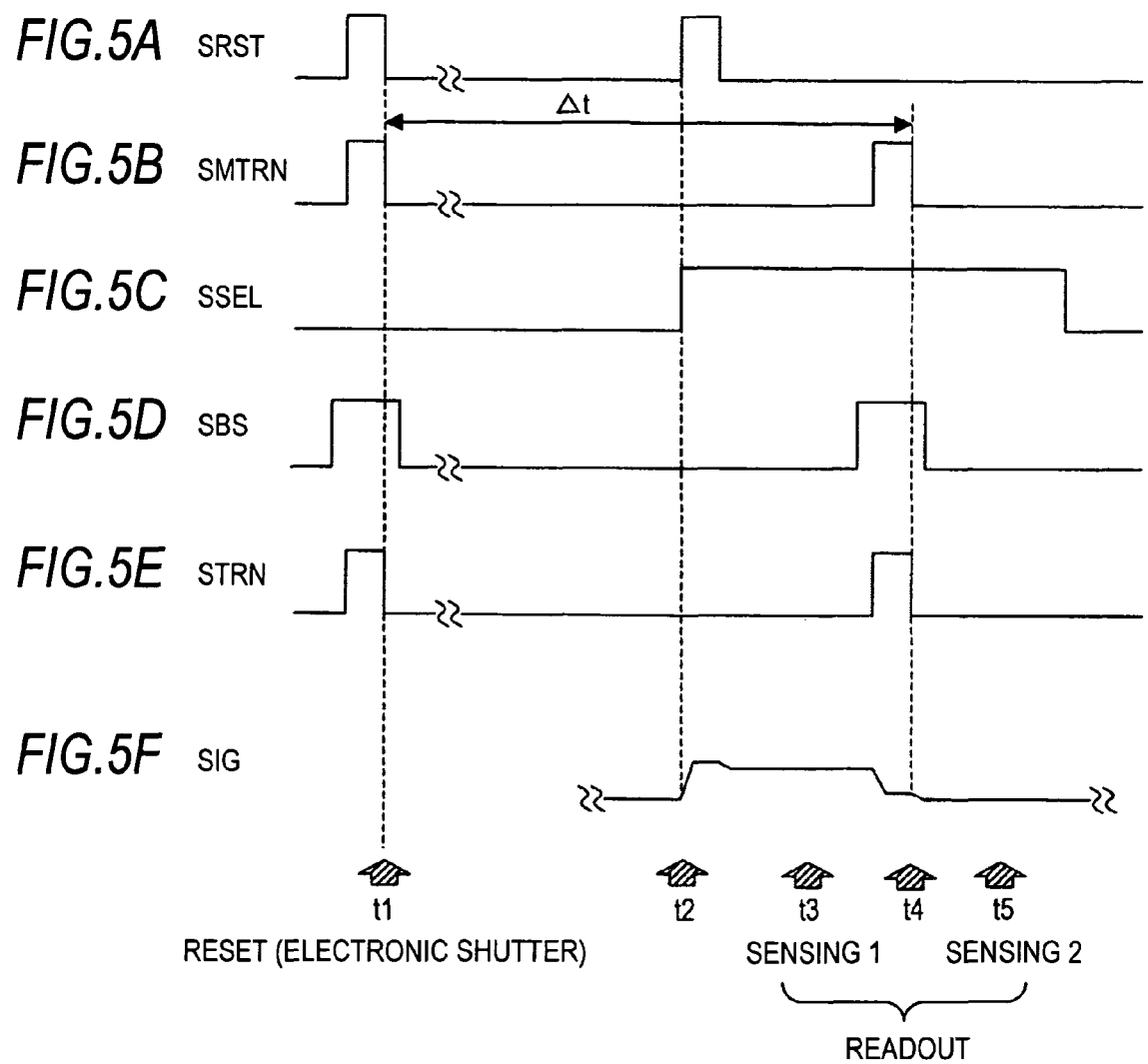
FIGS. 5A to 5F illustrate a timing chart of an operation example performed by pixel circuits when an arbitrary pixel block according to the first embodiment is selected.

FIG. 5A indicates a reset signal SRST, FIG. 5B indicates a main driving signal SMTRN, FIG. 5C indicates a selection signal SSEL, FIG. 5D indicates a pixel block selection signal SBS, FIG. 5E indicates a driving signal STRN, and FIG. 5F indicates a voltage signal SIG.

Step STa

Reset (electronic shutter) is executed on the pixel circuits 11 in the first small pixel block BLKα in the nth row (the small pixel block BLKα at the upper left among the four small pixel blocks BLKα shown in FIG. 3) (step STa). Step STa is executed to prevent reset noise and the like.

The pixel-block control circuit 15 extracts, from the control signal SCTL input from the resister register 14, data concerning the pixel block BLK that should be selected and outputs data S1 to the shift register group 16.

In order to reset the pixel circuits 11 in a desired small pixel block BLKα, the reset control circuit 17 supplies, on the basis of the data S1 input from the shift register group 16, a pulse-like pixel block selection signal SBS to the pixel block selection signal line BSL(l) (see FIG. 5D).

Pulse width of the pixel block selection signal SBS is desirably longer than pulse width of other signals (the reset signal SRST, etc.) excluding the selection signal SSEL in order to surely select the desired small pixel block BLKα. In this embodiment, the pixel block selection signal SBS is supplied longer than the other signals before and after time t1. Similarly, during readout of charges explained later, the pixel block selection signal SBS is supplied longer than the other signals before and after time t5.

The row selection circuit 12 outputs a row selection signal SAD for scanning the pixel circuits in the nth row to the row driving circuit 13. The row driving circuit 13 receives the row selection signal SAD and outputs a predetermined signal to signal lines in the nth row.

The row driving circuit 13 supplies a pulse-like reset signal SRST to the reset signal line RSTL(n) (see FIG. 5A) and, at the same time, supplies a pulse-like main driving signal SMTRN to the main transfer signal line MTRNL(n) (see FIG. 5B).

In a period of the pulse width, since the transistor 103 is maintained in the ON state, the main driving signal SMTRN is supplied to the transfer signal line TRNL(n) as the driving signal STRN (see FIG. 5E).

As a result, all the transfer transistors 112 and all the reset transistors 113 in the small pixel block BLKα simultaneously change to the ON state. The charges accumulated in the photoelectric conversion elements 111 are transferred to the floating diffusion FD and the potential of the floating diffusion FD is reset to the power supply voltage VDD (time t1).

In other words, the charges accumulated in all the photoelectric conversion elements 111 in the small pixel block BLKα are discharged to the power supply voltage VDD via the floating diffusion FD.

After the reset, the photoelectric conversion elements 111 of the pixel circuits 11 accumulate charges in a period from time t1 to time t4 (charge accumulating time).

Step STb

Readout of charges from all the pixel circuits 11 in the small pixel block BLKα is simultaneously executed (step STb).

At time t2, the row driving circuit 13 supplies the pulse-like reset signal SRST to the reset signal line RSTL(n) (see FIG. 5A). Consequently, the potential of the floating diffusion FD is once reset to the power supply voltage VDD.

At the same time, the row driving circuit 13 supplies a high-level selection signal SSEL to the selection signal line SELL(n) until a charge readout operation is finished (see FIG. 5C). Consequently, the selection transistors 115 of the pixel circuits 11 in the small pixel block BLKα are maintained in the ON state until the charge readout operation is finished.

A source follower circuit is configured by the amplification transistor 114, the constant current source circuit 18, and the vertical signal line VSL(m). Therefore, the following relational expression holds between potential Vsl of the vertical signal line VSL(n) and potential Vfd of the floating diffusion FD:

$$iv = (1/2) * \beta * (Vfd - Vth - Vsl)^2 \quad \text{Formula 1}$$

In Formula 1, iv represents a current value of a current i output by the constant current source circuit 18, Vth represents a threshold of the amplification transistor 114, and β represents a predetermined constant.

According to Formula 1, a linear relation having a fluctuation ratio close to 1 holds among the potential Vsl, the potential Vfd, and the threshold Vth. (Vfd−Vth−Vsl) is a fixed value. The fluctuation in the potential Vfd is linearly reflected on the potential Vsl.

When the selection transistor 115 is switched to the ON state, the voltage signal SIG is output to the sensing circuit 19 via the vertical signal line VSL(m). The pixel circuits 11 are accumulating charges. However, since the transfer transistor 112 is maintained in an OFF state, the sensing circuit 19 senses a state of the voltage signal SIG during the reset (time t3).

Thereafter, in order to execute the reset, the reset control circuit 17 supplies, based on the data S1 input from the shift register group 16, the pulse-like pixel block selection signal SBS to the pixel block selection signal line BSL(l) (see FIG. 5D).

At the same time, the row driving circuit 13 supplies the pulse-like main driving signal SMTRN to the main transfer signal line MTRNL(n) (see FIG. 5B).

In the period of the pulse width, since the transistor 103 is maintained in the ON state, the main driving signal SMTRN is supplied to the transfer signal line TRNL(n) as the driving signal STRN (see FIG. 5E).

As a result, all the transfer transistors 112 in the small pixel block BLKα simultaneously change to the ON state. Since the reset transistors 113 are maintained in the OFF (unenergized) state, the charges accumulated in the photoelectric conversion elements 111 are transferred to the floating diffusion FD.

The potential of the floating diffusion FD is amplified by the amplification transistor 114. The amplified voltage signal SIG is output to the sensing circuit 19 via the vertical signal line VSL(m) (time t4).

Therefore, the sensing circuit 19 generates, column by column, a difference (a difference of charge amounts) between the voltage signal SIG at time t2 and the voltage signal SG at time t5 and outputs the difference to the A/D converting circuit 20.

According to the difference between the voltage signals SIG sensed by the sensing circuit 19 column by column, the A/D converting circuit 20 converts, on the basis of the control by the horizontal transfer circuit 21, the voltage signal SIG of an analog format into the voltage signal SIG of a digital format column by column and outputs the digital voltage signal SIG to the horizontal transfer circuit 21.

The horizontal transfer circuit 21 sequentially selects, column by column, the counter, the memory, and the like included in the A/D converting circuit 20 in synchronization with a not-shown clock signal. When the digital voltage signal SIG is input from the A/D converting circuit 20, the horizontal transfer circuit 21 sequentially outputs the voltage signal SIG to the output circuit 22.

The output circuit 22 amplifies the voltage signal SIG input from the horizontal transfer circuit 21 and outputs the amplified voltage signal SIG to the camera control unit 32 (see FIG. 6).

As explained above, by changing the transfer transistor 112 and the transistor 103 of the switch circuit SW to the ON state in association with each other, it is possible to execute the reset on only the pixel circuits 11 in the desired small pixel block BLKα.

The processing in steps STa and STb is also simply referred to as imaging.

The light blocking area 102 is also divided into block in row units. The small pixel blocks BLKα are formed in the formed respective pixel blocks BLK. The pixel circuits 11 in the light blocking area 102 perform operations same as those in the effective pixel area 101.

However, the pixel circuit 11 in the light blocking area 102 outputs charges (a dark current) generated in the floating diffusion FD to the vertical signal line VSL(m) instead of amplifying charges generated by the photoelectric conversion element 111 and outputting the charges to the vertical signal line VSL(m).

The CMOS image sensor 1 is mounted on a camera having a configuration explained below.

FIG. 6 is a block diagram of a configuration example of a camera mounted with the CMOS image sensor according to the first embodiment. Only a main part of the camera according to the first embodiment is shown in FIG. 6.

As shown in FIG. 6, a camera 30 includes the CMOS image sensor 1, an optical system 31 that guides incident light, a camera control unit 32, and a data output unit 33. The camera control unit 32 corresponds to a control unit and a signal processing unit described in claims.

In the optical system 31, a lens 311 that focuses incident light (image light) on an imaging surface (the pixel unit 10), a stop 312 for adjusting a light amount, and a low-pass filter 313 that causes incident light having a specific frequency (low frequency) to pass.

The camera control unit 32 includes a memory 321, an illuminance acquiring unit 322, and a charge-accumulating-time determining unit 323. The camera control unit 32 includes a computer such as a DSP. (Digital Signal Processor) and performs determination of reset timing, predetermined signal processing, exposure control for the optical system 31, control of the CMOS image sensor 1, and the like.

The camera control unit 32 applies predetermined image processing such as color interpolation, γ correction, RGB conversion processing, and YUV conversion processing to the voltage signal SIG input from the output circuit 22 of the CMOS image sensor 1. The camera control unit 32 outputs the voltage signal SIG subjected to the image processing to the data output unit 33 as data.

The camera control unit 32 measures the dark current (a noise value of the dark current) output by the pixel circuits 11 of the light blocking area 102 and performs, in image processing, processing for deducting noise due to the dark current from generated pickup image data.

The memory 321 stores a first preset chart and a second preset chart (reference data described in claims) and a computer program concerning control of the CMOS image sensor 1. The memory 321 is accessed by the illuminance acquiring unit 322 and the charge-accumulating-time determining unit 323. The memory 321 also stores, besides those explained above, temporary data and the like output by the processing units of the camera control unit 32.

The illuminance acquiring unit 322 applies processing explained below to the voltage signal SIG input from the CMOS image sensor 1.

The illuminance acquiring unit 322 extracts a luminance level from the voltage signal SIG and calculates an average <Y> of luminance levels over the entire effective pixel area 101. The illuminance acquiring unit 322 outputs the calculated average <Y> of the luminance levels to the charge-accumulating-time determining unit 323.

After imaging is executed in standard charge accumulating time $T_{avr}$ explained later, the illuminance acquiring unit 322 extracts again a luminance level from the voltage signal SIG output by the pixel circuits 11 in the effective pixel area 101.

The illuminance acquiring unit 322 extracts a luminance level for each of the pixel blocks BLK and calculates an average $<Y_{BLK}>$ of luminance levels for each of the pixel blocks BLK. The illuminance acquiring unit 322 outputs the calculated average $<Y_{BLK}>$ of the luminance levels to the charge-accumulating-time determining unit 323. The average $<Y_{BLK}>$ of the luminance values has a different value for each of the pixel blocks BLK.

The charge-accumulating-time determining unit 323 allocates charge accumulating times to the respective pixel blocks BLK with reference to the first or second preset chart stored in the memory 321.

The charge-accumulating-time determining unit 323 collates the average <Y> of the luminance values input from the illuminance acquiring unit 322 with the first preset chart and determines the standard charge accumulating time $T_{avr}$, a gain, and a stop value. The charge-accumulating-time determining unit 323 outputs the determined standard charge accumulating time $T_{avr}$ and the like to the register 14 of the CMOS image sensor 1 as the control signal SCTL.

Figure 7:
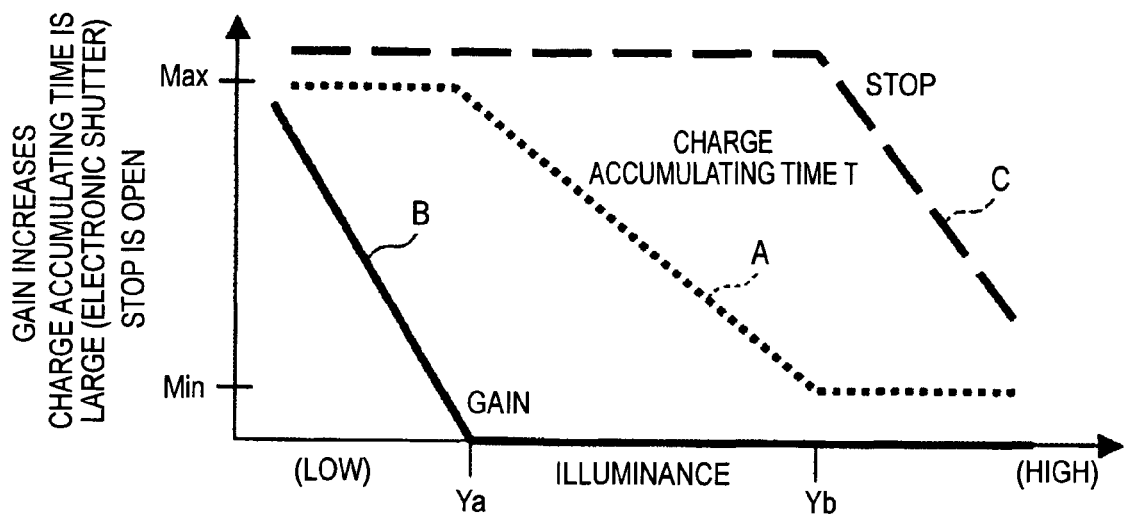
FIG. 7 is a diagram of an example of a first preset chart according to the first embodiment.

As shown in FIG. 7, the first preset chart indicates a relation of charge accumulating time, a gain, and a stop value to illuminance. As the illuminance, the average <Y> of the luminance levels over the entire effective pixel area 101 is used.

FIG. 7 is a diagram of an example of the first preset chart according to the first embodiment. In FIG. 7, a broken line A indicates the charge accumulating time, a solid line B indicates the gain, and a broken line C indicates a stop value (amount) by the stop 312.

As shown in FIG. 7, when the illuminance is extremely small (illuminance<threshold Ya), the standard charge accumulating time $T_{avr}$ takes maximum charge accumulating time $T_{max}$. The charge accumulating time decreases from the maximum charge accumulating time $T_{max}$ as the illuminance increases (threshold Ya<illuminance<threshold Yb). The standard charge accumulating time $T_{avr}$ during this period takes T. When the illuminance is extremely large (illuminance<threshold Yb), the standard charge accumulating time $T_{avr}$ takes minimum charge accumulating time $T_{min}$.

The gain decreases as the illuminance increases (illuminance<threshold Ya). When the illuminance exceeds the threshold Ya, the gain decreases to 0. When the illuminance is extremely high, the stop value is small (illuminance>threshold Yb).

The charge-accumulating-time determining unit 323 collates the average $<Y_{BLK}>$ of the luminance levels input from the luminance acquiring unit 322 with the second preset chart and determines the charge accumulating time $T_{BLK}$ for each of the pixel blocks BLK. The charge-accumulating-time determining unit 323 outputs the determined charge accumulating time TBLK to the register 14 of the CMOS image sensor 1 as the control signal SCTL.

Figure 8:
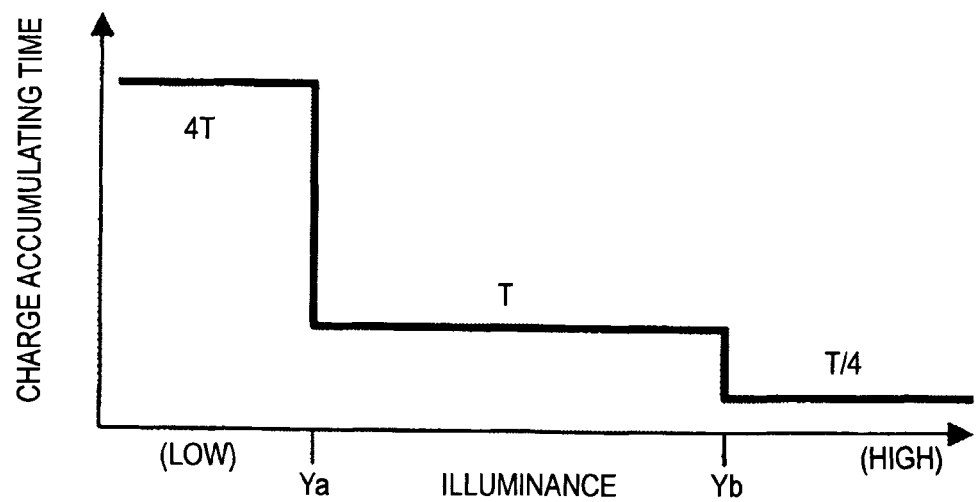
FIG. 8 is a diagram of an example of a second preset chart according to the first embodiment.

FIG. 8 is a diagram of an example of the second preset chart according to the first embodiment.

As shown in FIG. 8, the second preset chart indicates a relation of the charge accumulating time to the illuminance. As the illuminance, an average $<Y_{BLK}>$ of luminance levels for each of the pixel blocks BLK is used.

As shown in FIG. 8, in the second preset chart, the illuminance is sectioned into three levels according to thresholds. Charge accumulating time corresponding to the illuminance is set.

When the illuminance is intermediate (threshold Ya<illuminance<threshold Yb), the charge accumulating time $T_{BLK}$ takes T. When the illuminance is extremely small (illuminance<threshold Ya), the charge accumulating time $T_{BLK}$ takes a value four times as large as the charge accumulating time T, i.e., 4T. When the illuminance is extremely large (illuminance<threshold Yb), the charge accumulating time $T_{BLK}$ takes a value ¼ times as large as the charge accumulating time T, i.e., T/4. In the following explanation, times predetermined times as large as the charge accumulating time T are simply represented in such a manner as 4T and T/4 as appropriate.

As explained above, the charge accumulating time is allocated according to the illuminance. The standard charge accumulating time $T_{avr}$ and the charge accumulating time $T_{BLK}$ are those for the pixel circuits 11 of the effective pixel area 101. For the pixel circuits 11 of the light blocking area 102, the charge-accumulating-time determining unit 323 sets the charge accumulating time to shift the charge accumulating time for each row in such a manner as 2T, T, T/2, T, and the like. Consequently, even in the light blocking area 102 having a very small area, it is possible to measure a dark current at different timing of reset.

The data output unit 33 is input with data subjected to image processing from the camera control unit 32 and outputs the data to, for example, a monitor and an external memory.

Operations of the camera 30 mounted with the CMOS image sensor 1 are explained with reference to FIGS. 9 to 12.

Figure 9:
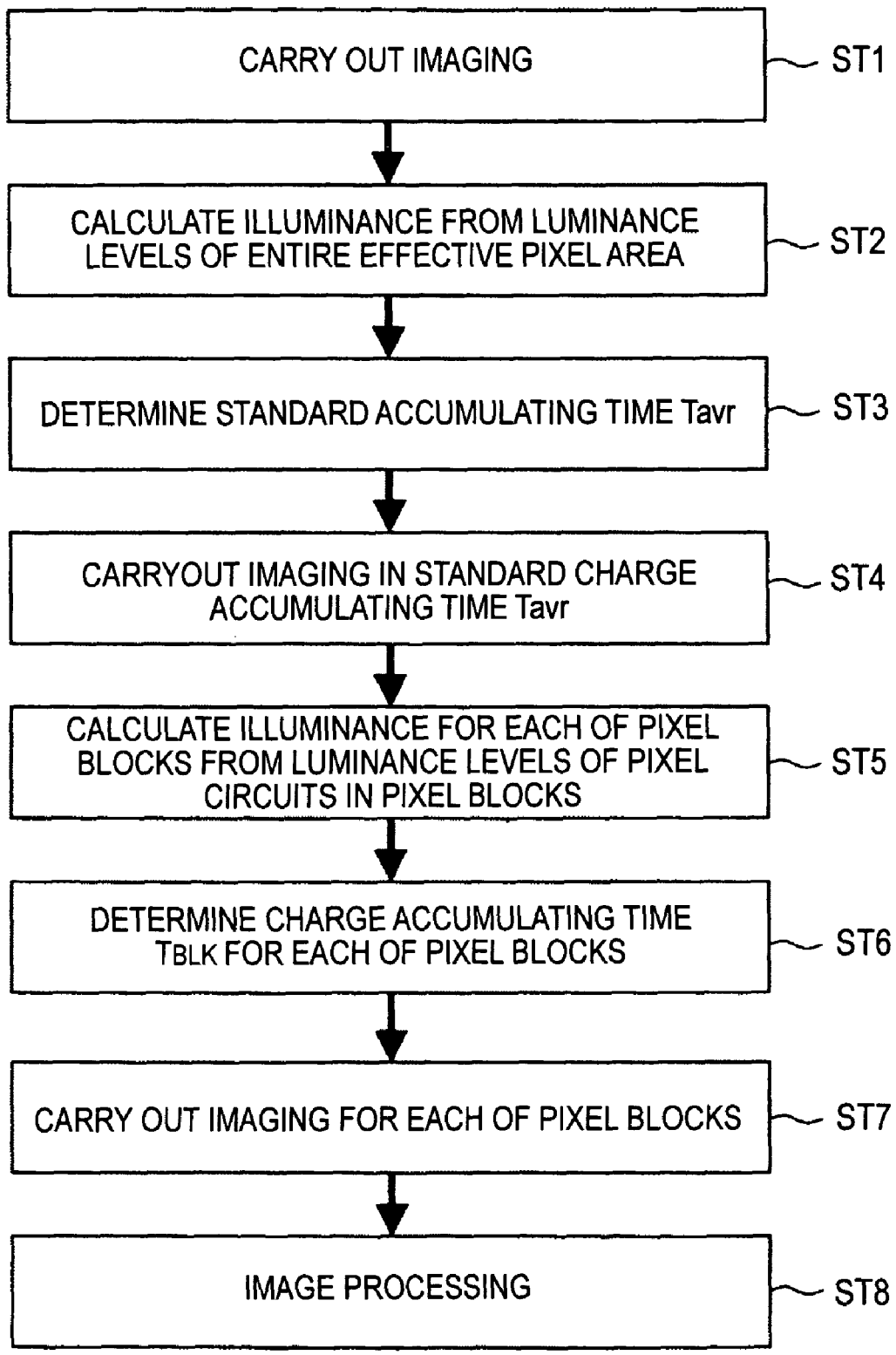
FIG. 9 is a flowchart of an operation example of a camera according to the first embodiment.

FIG. 9 is a flowchart of an operation example of the camera according to the first embodiment.

Step ST1

In step ST1, imaging for acquiring a luminance level is executed.

Incident light of an object OBJ focused through the lens 311 is made incident on the pixel unit 10 of the CMOS image sensor 1. Only incident light having a low frequency passes through the low-pass filter 313.

In this step, the imaging is executed irrespective of division of a pixel area. Therefore, the reset of the pixel circuits 11 (step STa) and the readout of charges (step STb) are executed for each row.

The reset control circuit 17 supplies the pulse-like pixel block selection signal SBS to all the pixel block selection signal lines BSL. The reset control circuit 17 outputs the pixel block selection signal SBS such that the transfer transistor 112 and the transistor 103 of the switch circuit SW change to the ON state in association with each other.

Consequently, the high-level main driving signal SMTRN is supplied to the main transfer signal line (n), the transistor 103 of the switch circuit SW in the same row changes to the ON state, and all the transfer transistors 112 in the same row are simultaneously switched to the ON state. In other words, the pixel circuits 11 in the same row are collectively controlled.

Figure 10:
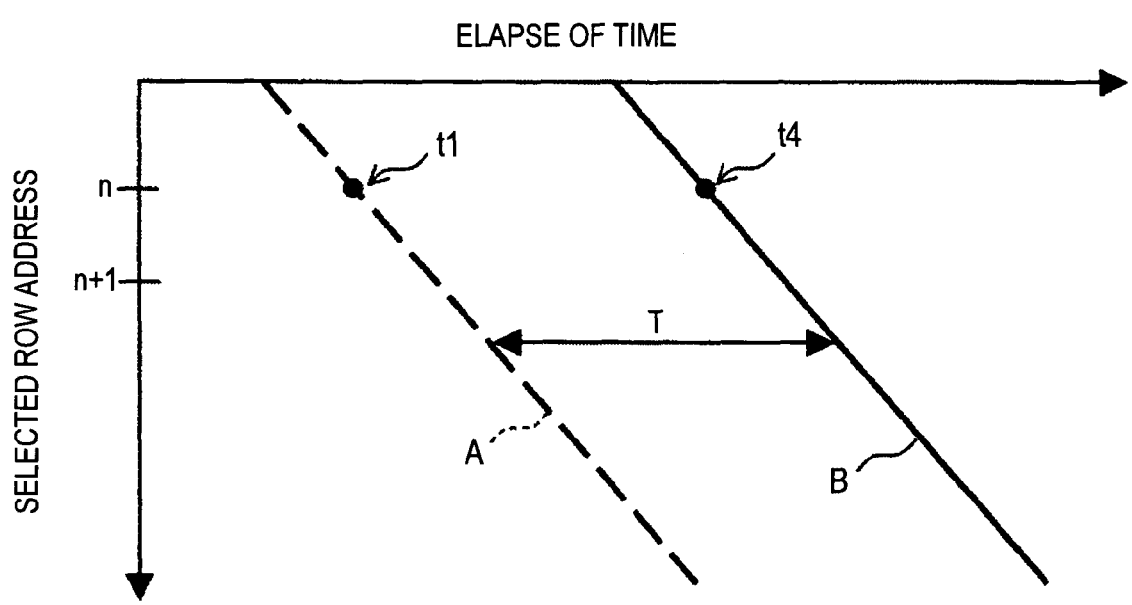
FIG. 10 is a timing chart of pixel circuits in step ST1 shown in FIG. 9.

FIG. 10 is a timing chart of the pixel circuits in step ST1 shown in FIG. 9. A broken line A in FIG. 10 corresponds to the reset (the electronic shutter) executed at time t1 shown in FIGS. 5A to 5F. A solid line B corresponds to the readout of charges executed at time t4 shown in FIGS. 5A to 5F.

As shown in FIG. 10, the reset is executed on the pixel circuits 11 in the nth row at time t1 and the readout of charges is executed on the pixel circuits 11 at time t4.

A time interval T between the broken line A and the solid line B is charge accumulating time. After the readout of charges for the nth row is finished, the reset and the readout of charges are executed on the pixel circuits 11 in the (n+1)th pixel circuits 11.

Step ST2

In step ST2, after the readout of charges from the pixel circuits 11 in the entire effective pixel area 101 is executed, illuminance is calculated from the pixel circuits 11.

The illuminance acquiring unit 322 extracts a luminance level from the voltage signal SIG output by the pixel circuits 11 in the effective pixel area 101 and calculates the average $<Y>$ of luminance levels over the entire effective pixel area 101. The illuminance acquiring unit 322 outputs the calculated average $<Y>$ of the luminance levels to the charge-accumulating-time determining unit 323.

Step ST3

In step ST3, the standard charge accumulating time $T_{avr}$ is calculated and exposure control for the entire pixel area is executed.

The charge-accumulating-time determining unit 323 collates the average $<Y>$ of the luminance levels input from the illuminance acquiring unit 322 with the first preset chart and determines the standard charge accumulating time $T_{avr}$, a gain, and a stop value. The charge-accumulating-time determining unit 323 outputs the determined standard charge accumulating time $T_{avr}$ and the like to the register 14 of the CMOS image sensor 1 as the control signal SCTL.

The camera control unit 32 controls the stop 312 to adjust the stop value. The camera control unit 32 also adjusts the gain.

Step ST4

In step ST4, imaging same as that in step ST1 is executed in the standard charge accumulating time $T_{avr}$.

Step ST5

In step ST5, after the imaging is executed in the standard charge accumulating time $T_{avr}$, illuminance for each of the pixel blocks BLK is calculated.

The illuminance acquiring unit 322 extracts a luminance level for each of the pixel blocks BLK and calculates the average $<Y_{BLK}>$ of luminance levels for each of the pixel blocks BLK. The illuminance acquiring unit 322 outputs the calculated average $<Y_{BLK}>$ of the luminance levels to the charge-accumulating-time determining unit 323.

Step ST6

In step ST6, the charge accumulating time $T_{BLK}$ is allocated to each of the pixel blocks BLK and exposure control for each of the pixel blocks BLK is executed.

The charge-accumulating-time determining unit 323 collates the average $<Y_{BLK}>$ of the luminance levels input from the illuminance acquiring unit 322 with the second preset chart and determines the charge accumulating time $T_{BLK}$ for each of the pixel blocks BLK. The charge-accumulating-time determining unit 323 outputs the determined charge accumulating time $T_{BLK}$ to the register 14 of the CMOS image sensor 1 as the control signal SCTL.

The charge-accumulating-time determining unit 323 sets charge accumulating time in the pixel circuits 11 of the light blocking area 102 to shift the charge accumulating time for each row in such a manner as 4T, T, T/4, T, and the like.

Step ST7

In step ST7, imaging is executed in charge accumulating time $T_{BLK}$, different for each of the pixel blocks BLK, i.e., different exposure time.

Figure 11:
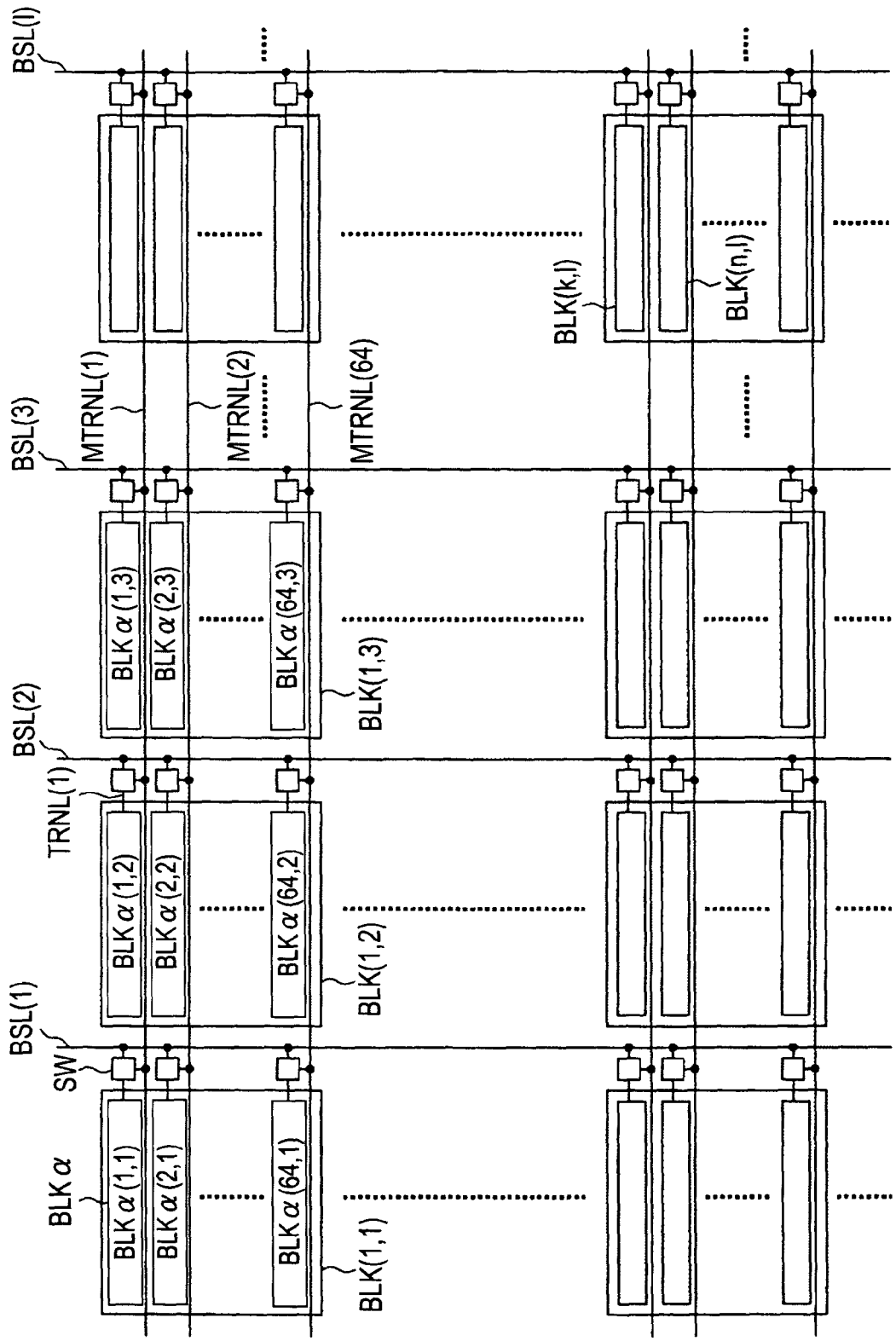
FIG. 11 is a schematic diagram of an effective pixel area for explaining processing in step ST7 shown in FIG. 9.

FIG. 11 is a schematic diagram of an effective pixel area for explaining the processing in step ST7 shown in FIG. 9. In FIG. 11, for simplification of explanation, signal lines and the like are omitted as appropriate.

Figure 12:
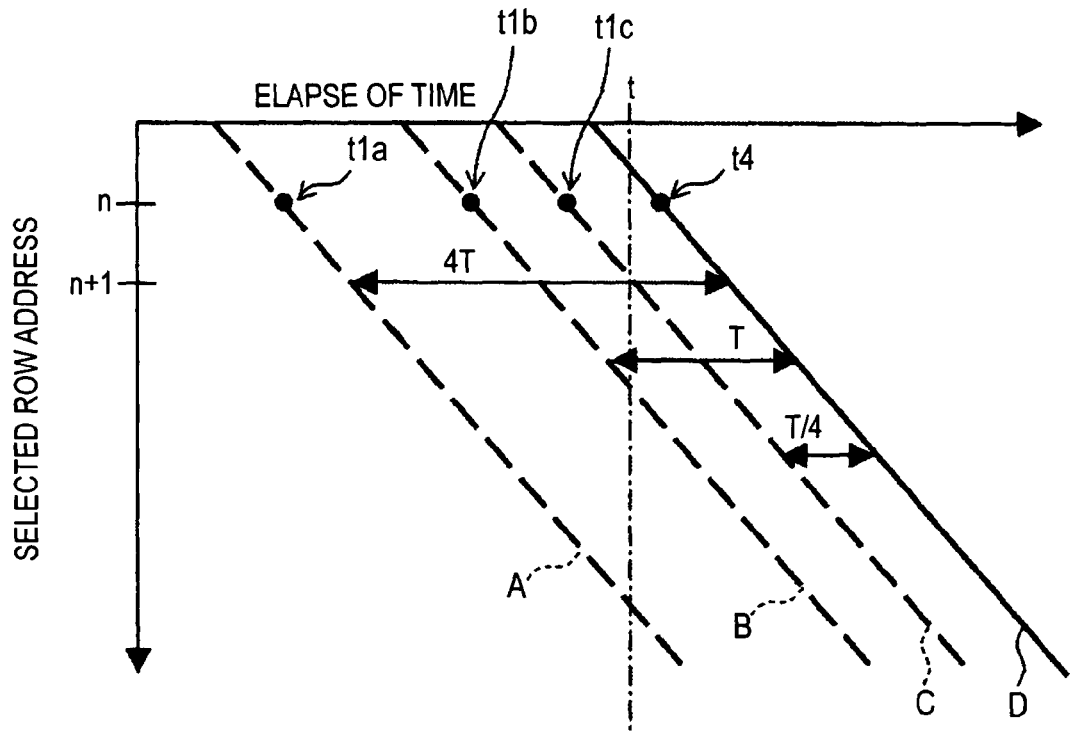
FIG. 12 is a timing chart of the pixel circuits in step ST7 shown in FIG. 9.

FIG. 12 is a timing chart of pixel circuits in step ST7 shown in FIG. 9.

As shown in FIG. 11, 32×32 pixel blocks BLK are formed in the effective pixel area 101. An arbitrary pixel block BLK is represented as pixel block BLK(k,1) as appropriate (k=1=1, 2, . . . ). Sixty-four small pixel blocks BLKα are formed in one pixel block BLK. An arbitrary small pixel block BLKα is represented as small pixel block BLKα(n,1) as appropriate (n=1, 2, . . . ).

For example, it is assumed that, in the processing in step ST6, the charge accumulating time $T_{BLK}$ for a pixel block BLK(1,1) is determined as T, the charge accumulating time $T_{BLK}$ for a pixel block BLK(1,2) is determined as 4T, and the charge accumulating time $T_{BLK}$ for a pixel block BLK(1,3) is determined as T/4.

In the following explanation, three pixel blocks BLK in the effective pixel area 101 are explained.

Since the charge accumulating time $T_{BLK}$ is different from each of the pixel blocks BLK, reset control is started from the pixel block BLK with longest charge accumulating time $T_{BLK}$. In other words, the reset is executed in order of the pixel blocks BLK(1,2), BLK(1,1), and BLK(1,3).

In order to collectively reset the pixel circuits 11 in a small pixel block BLKα(1,2), the reset control circuit 17 supplies the pulse-like pixel block selection signal SBS to a pixel block selection signal line BSL(2).

The row driving circuit 13 supplies the pulse-like reset signal SRST to a reset signal line RSTL(1) and, at the same time, supplies the pulse-like main driving signal SMTRN to a main transfer signal line MTRNL(1).

In the period of the pulse width, since the transistor 103 is maintained in the ON state, the main driving signal SMTRN is supplied to the transfer signal line TRNL(1) as the driving signal STRN.

As a result, all the transfer transistors 112 and all the reset transistors 113 in the small pixel block BLKα(1,2) simultaneously change to the ON state and the reset is executed on the pixel circuits 11 in the small pixel block BLKα(1,2) (time t1a of a broken line A).

In order to collectively reset the pixel circuits 11 in the small pixel block BLKα(1,1), the reset control circuit 17 supplies the pulse-like pixel block selection signal SBS to a pixel block selection signal line BSL(1).

The row driving circuit 13 supplies the pulse-like reset signal SRST to the reset signal line RSTL(1) and, at the same time, supplies the pulse-like main driving signal SMTRN to the main transfer signal line MTRNL(1).

As in the case of the small pixel block BLKα(1,2), the reset is executed on the pixel circuits 11 in a small pixel block BLKα(1,1) (time t1b of a broken line B).

Subsequently, in order to collectively reset the pixel circuits 11 in a small pixel block BLKα(1,3), the reset control circuit 17 supplies the pulse-like pixel block selection signal SBS to a pixel block selection signal line BSL(3).

The row driving circuit 13 supplies the pulse-like reset signal SRST to the reset signal line RSTL(1) and, at the same time, supplies the pulse-like main driving signal SMTRN to the main transfer signal line MTRNL(1).

As in the case of the small pixel block BLKα(1,2), the reset is executed on the pixel circuits 11 in the small pixel block BLKα(1,3) (time t1c of a broken line C).

The readout of charges is executed in row units in the same manner as step STb (time t4 of a solid line).

Subsequently, the reset is executed in order of the small pixel blocks BLKα(2,2), BLKα(2,1), and BLKα(2,3).

In this way, the reset and the readout of charges are sequentially executed on all the pixel circuits 11 in the pixel blocks BLK. The reset and the readout of charges are executed on the other pixel blocks BLK in the same manner.

The processing in step ST7 is executed on the pixel circuits 11 of the light blocking area 102 in the same manner.

As shown in FIG. 12, at time t, readout of charges in different rows (see a solid line D) and reset of three systems (see broken lines A to C) are simultaneously executed. The row driving circuit 13 and the reset control circuit 17 execute the readout of charges and the reset in a time division manner while changing a selection row.

For example, in imaging at 30 frames/second, processing time for one row is (1/30/2048) second, i.e., about 16 μseconds. In the reset for three systems, a series of processing of the CMOS image sensor 1 can be completed within this time.

Step ST8

In step ST8, image processing is executed.

Since exposure time is different for each of the pixel blocks BLK, brightness is not uniform on an entire pickup image. Therefore, in the image processing, it is necessary to adjust a gain such that brightness of the entire pickup image is uniform in the image processing.

Therefore, the camera control unit 32 multiplies the image data (the voltage signal SIG) acquired from the pixel circuits 11 of the pixel blocks BLK with a gain proportional to an inverse of the charge accumulating time $T_{BLK}$.

When the charge accumulating time TBLK is 4T, T, or T/4, if the gradation of a pickup image is 10 bits, the camera control unit 32 multiplies each image data of the pixel blocks BLK with a one-time (0 dB), four-time (12 dB), or sixteen-time (24 dB) gain.

According to the processing, the gradation of the pickup image changes to 14 bits. However, since the gain of a dark space is the one-time gain, a substantial level of noise does not change. Therefore, it is possible to expand a dynamic range.

When image data acquired from the pixel blocks BLK are combined, a step of brightness may occur in a joint (a boundary) of the image data.

Therefore, the camera control unit 32 divides a luminance level into a low frequency component and a high frequency component and performs correction processing such as shading-off of a step of the low frequency component such that the joint of the image data smoothly changes.

The camera control unit 32 performs color interpolation, y correction, RGB conversion processing, YUV conversion processing, and the like besides the processing explained above.

The camera control unit 32 measures a dark current output by the pixel circuits 11 of the light blocking area 102 and also performs, in image processing, processing for deducting noise due to the dark current from generated pickup image data.

Thereafter, the data output unit 33 outputs data subjected to the image processing by the camera control unit 32 to a monitor and an external memory.

According to this embodiment, the pixel area is divided into plural blocks and the selection control unit collectively executes, in pixel block BLK units, reset control for discharging the charges accumulated by the pixel circuits 11 in the pixel blocks. The selection control unit selects desired pixel blocks BLK, changes timing of the reset control for each of the selected pixel blocks BLK, and allocates different charge accumulating times to the pixel blocks. Therefore, it is possible to obtain effects explained below.

Since exposure time can be adjusted for each of the pixel blocks BLK, even when extreme light and shade occurs in a pickup image like backlight, it is possible to reduce noise such white void and expand a dynamic range.

For example, even a CMOS image sensor that originally has gradation of 10 bits can expand a dynamic range while maintaining sensitivity and represent a pickup image with gradation of 12 or more bits.

Further, it is possible to acquire an optimum pickup image in one imaging even if processing for, while changing timing of the electric shutter, performing imaging plural times and combining plural pickup images is not executed. Therefore, there is also an advantage that it is unnecessary to prepare an unnecessary frame buffer.

The number of divisions of the pixel unit 10 can be suitably set like 128×128. However, when the number of divisions increases, a series of processing such as the reset and the readout of charges may take time. In such a case, it is possible to arrange shift registers for the reset of plural systems, respectively, and adjust timing of the reset.

First Modification of the Light Blocking Area

A modification of the light blocking area 102 is explained with reference to FIG. 13.

Figure 13:
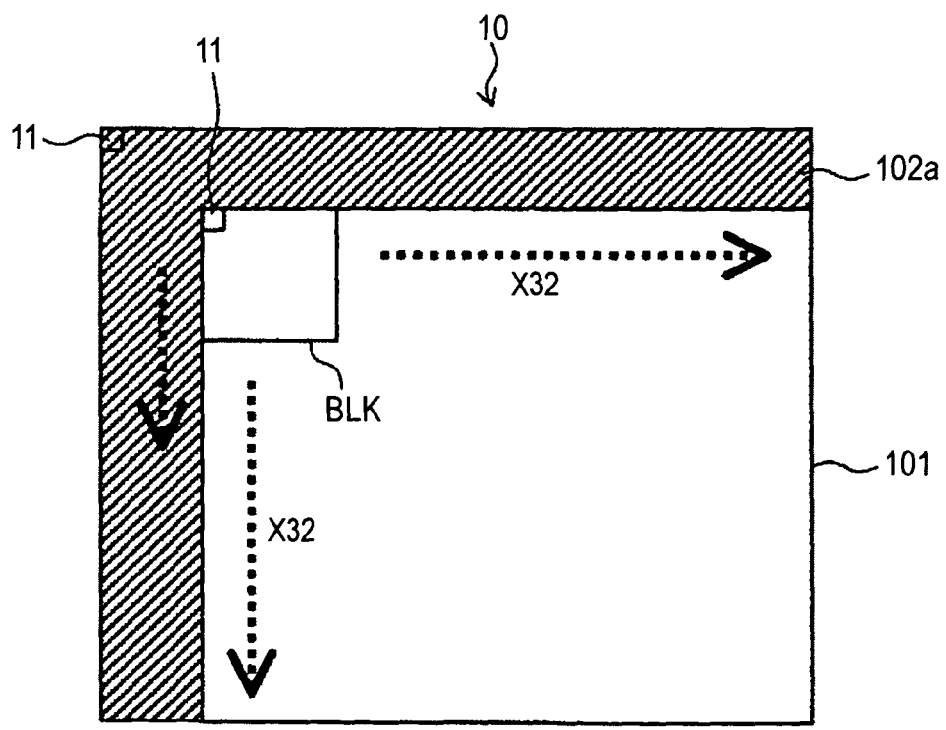
FIG. 13 is a schematic diagram of a modification of a light blocking area according to the first embodiment.

FIG. 13 is a schematic diagram of a modification of the light blocking area according to this embodiment.

As shown in FIG. 13, a light blocking area 102a indicated by hatching is not divided into pixel blocks.

Therefore, reset control in the light blocking area 102a is executed in longest charge accumulating time TBLK in the effective pixel area 101 row by row.

For example, it is assumed that, in the processing in step ST6, the longest charge accumulating time TBLK among the charge accumulating times $T_{BLK}$ determined by the charge-accumulating-time determining unit 323 is 2T.

In this case, in step ST7, the reset control is executed row by row on the pixel circuits 11 of the light blocking area 102 such that the charge accumulating time $T_{BLK}$ is 2T. As in steps ST6 and ST7, the reset control is executed on the pixel circuits 11 of the effective pixel area 101 in pixel block BLK units.

The camera control unit 32 deducts, from pickup image data, a value obtained by multiplying a dark current (noise) value obtained in the other charge accumulating times with a ratio of the charge accumulating times.

For example, when the other charge accumulating times $T_{BLK}$ are T and T/2, the camera control unit 32 multiplies a dark current with ½ when the charge accumulating time $T_{BLK}$ is T and multiplies a dark current with ¼ when the charge accumulating time $T_{BLK}$ is T/2.

Consequently, it is possible to reduce dark current noise.

Second Modification of the Light Blocking Area

Figure 14:
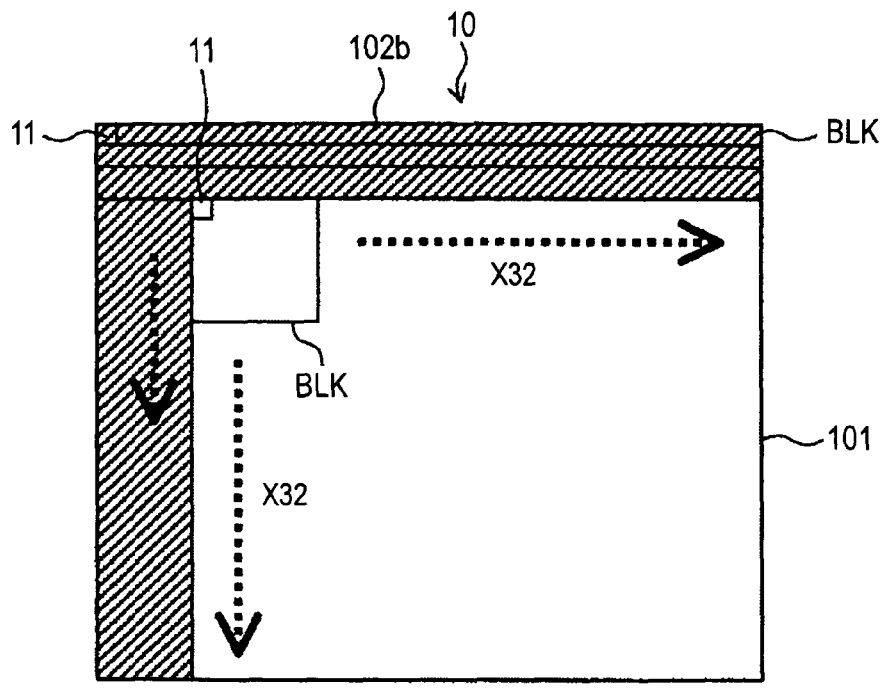
FIG. 14 is a schematic diagram of a modification of the light blocking area according to the first embodiment.

FIG. 14 is a schematic diagram of a modification of the light blocking area according to this embodiment.

As shown in FIG. 14, only a part of the light blocking area 102 may be divided into pixel blocks. In this case, the reset control is executed on the pixel blocks BLK block by block. The reset control is executed on the undivided pixel area in the longest charge accumulating time $T_{BLK}$.

Second Embodiment

Data corresponding to the number of pixel blocks is transmitted and received between the camera control unit 32 and the CMOS image sensor 1. Therefore, according to an increase in the number of division of a pixel area, a data transfer amount also increases.

If the pixel area is divided into 32×32 pixel blocks BLK and 2-bit data (data for the main transfer signal MTRNL and the pixel block selection signal SBS) is allocated to the reset control for the pixel blocks BLK as in the first embodiment, 256-byte data is transmitted and received between the camera control unit 32 and the CMOS image sensor 1. The number of shift registers 16 equivalent to the transfer data is necessary for the transmission and reception of the data.

In a second embodiment of the present invention, in order to reduce a data transfer amount, one square area is formed by plural pixel blocks BLK and exposure control is executed for each of square areas ARA. The square area is explained below with reference to FIG. 15.

Figure 15:
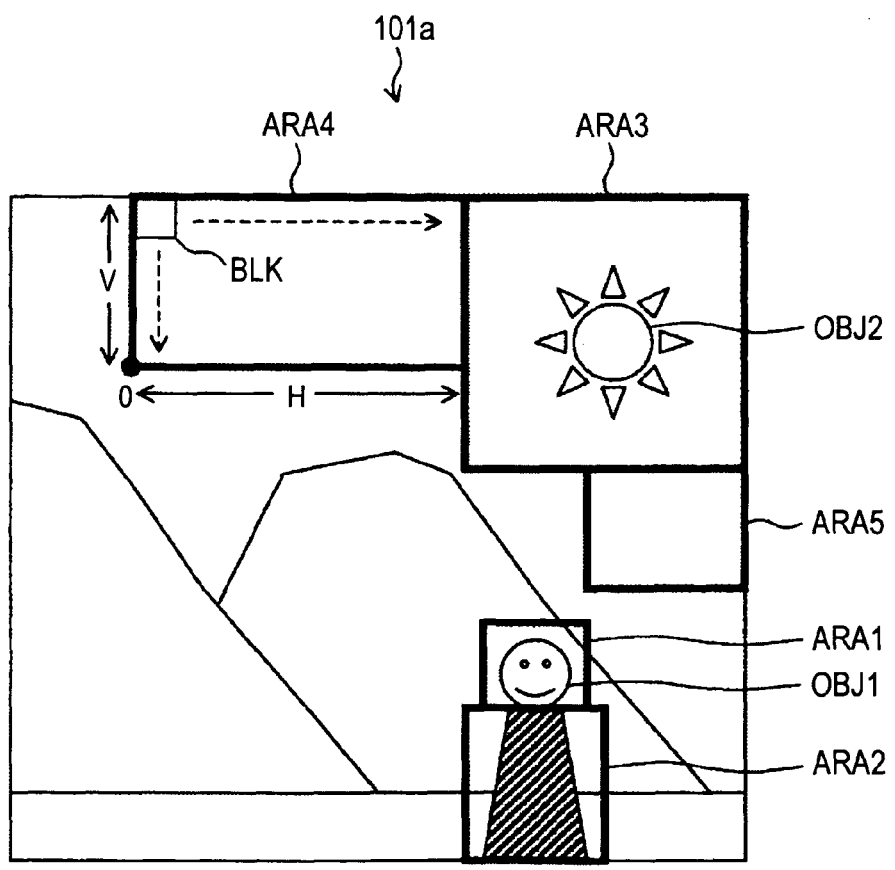
FIG. 15 is a conceptual diagram for explaining a configuration example of a square area according to a second embodiment of the present invention.

FIG. 15 is a conceptual diagram for explaining a configuration example of the square area according to the second embodiment.

As shown in FIG. 15, five square areas ARA1 to ARA5 are formed in an effective pixel area 101a (an imaging screen). The respective square areas ARA have different sizes and forming positions.

For example, around an object OBJ1 like a person, in order to finely perform exposure control, the square areas ARA1 and ARA2 are formed by a small number of pixel blocks BLK (e.g., 3×3). In a background OBJ2 with high illuminance like the sun, in order to roughly perform exposure control, the square area ARA3 is formed by a large number of pixel blocks BLK (e.g., 10×10).

Data concerning a position necessary for one square area ARA is a coordinate of the origin O, width H, and height V of the square area ARA. If 1-bit data is allocated to the coordinate, the width H, and the height V and data for reset control is added, the square areas ARA can be defined by about 5 bits×5 (the number of square areas)=25 bits.

In order to prevent noise such as a vertical streak and a horizontal streak from mixing in an imaging screen, it is desirable to also define the square areas ARA to be formed in a substantial regular square shape. If the pixel area is divided to form the pixel blocks BLK in a substantial regular square shape, there is an advantage that the square areas ARA can be easily defined.

The square areas ARA are formed in the effective pixel area 101. Therefore, in the explanation of the second embodiment, the pixel blocks BLK and the like of the effective pixel area 101 are explained.

Figure 16:
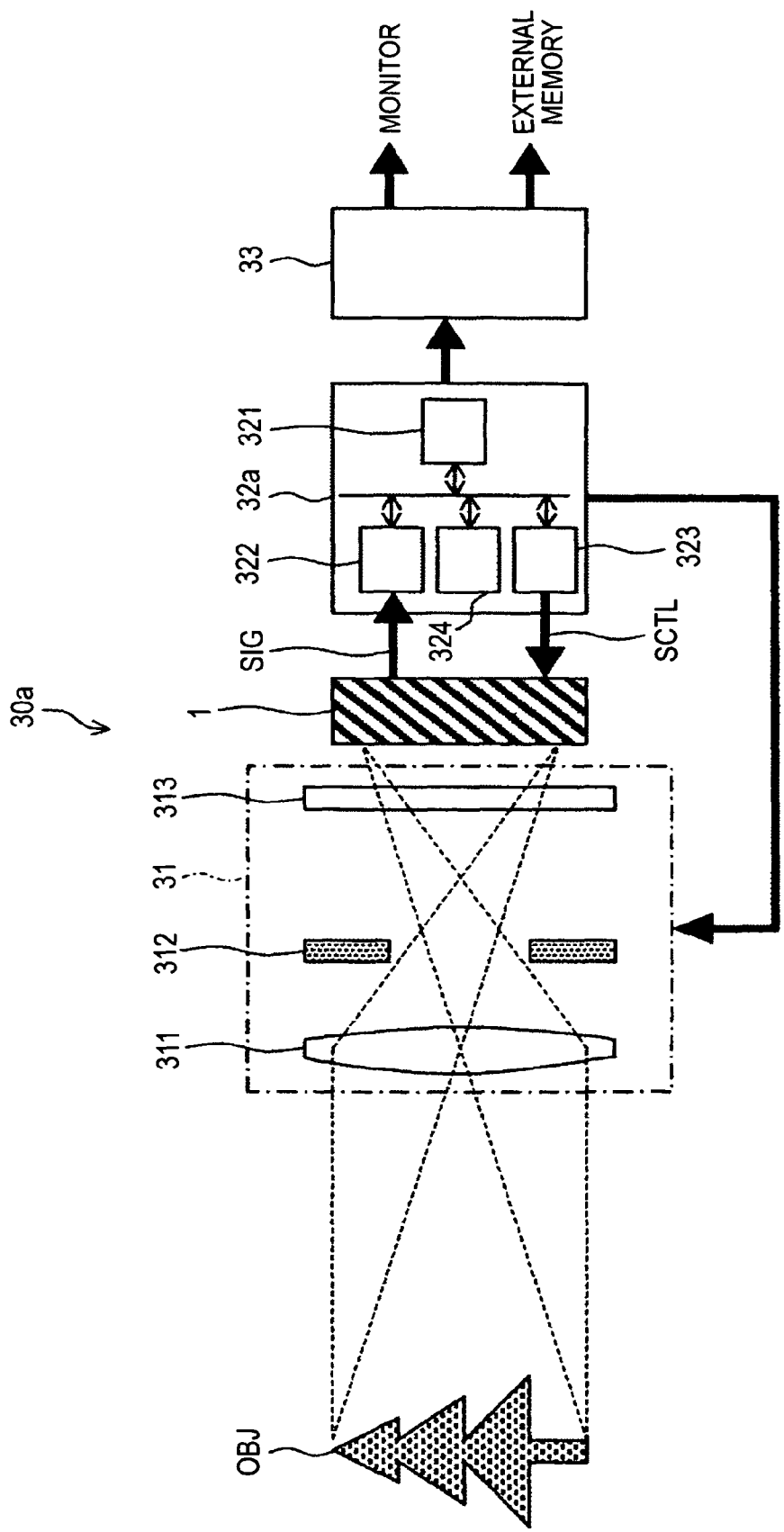
FIG. 16 is a block diagram of a configuration example of a camera according to the second embodiment.

In order to define the square areas ARA, a camera 30a adopts a configuration shown in FIG. 16.

FIG. 16 is a block diagram of a configuration example of a camera according to the second embodiment. In FIG. 16, only a main part of the camera according to the second embodiment is shown.

As shown in FIG. 16, a camera control unit 32a includes the memory 321, the illuminance acquiring unit 322, the charge-accumulating-time determining unit 323, and a square-area defining unit 324.

The square-area defining unit 324 defines the square areas ARA on the basis of the average $<Y_{BLK}>$ of the luminance levels for each of the pixel blocks BLK input from the illuminance acquiring unit 322 and the average $<Y>$ of the luminance levels over the effective pixel area 101.

Specifically, the square-area defining area 324 determines whether a difference between the average $<Y_{BLK}>$ and the average $<Y>$ (also simply referred to as luminance level difference) exceeds a predetermined reference value and specifies the pixel blocks BLK, the average $<Y_{BLK}>$ of which is quite different from the average $<Y>$.

The square-area defining unit 324 collects plural pixel blocks having a large luminance level difference to define the square areas ARA. The number of square areas ARA to be defined may be one or plural. The plural square areas ARA do not need to continue to one another.

In defining the square areas ARA, the square-area defining unit 324 may define the square areas ARA according to an object. For example, it is possible to perform fine exposure control by defining plural small square areas ARA (e.g., ARA1 and ARA2) for the object OBJ1 like a person (see FIG. 15). A user can designate the square area ARA to perform fine exposure control for only the designated square area ARA.

The charge-accumulating-time determining unit 323 collates the average $<Y_{BLK}>$ of the luminance levels input from the illuminance acquiring unit 322 with the second preset chart and determines the charge accumulating time TBLK for each of the square areas ARA.

An operation example of the camera according to the second embodiment is explained below with reference to FIG. 17.

Figure 17:
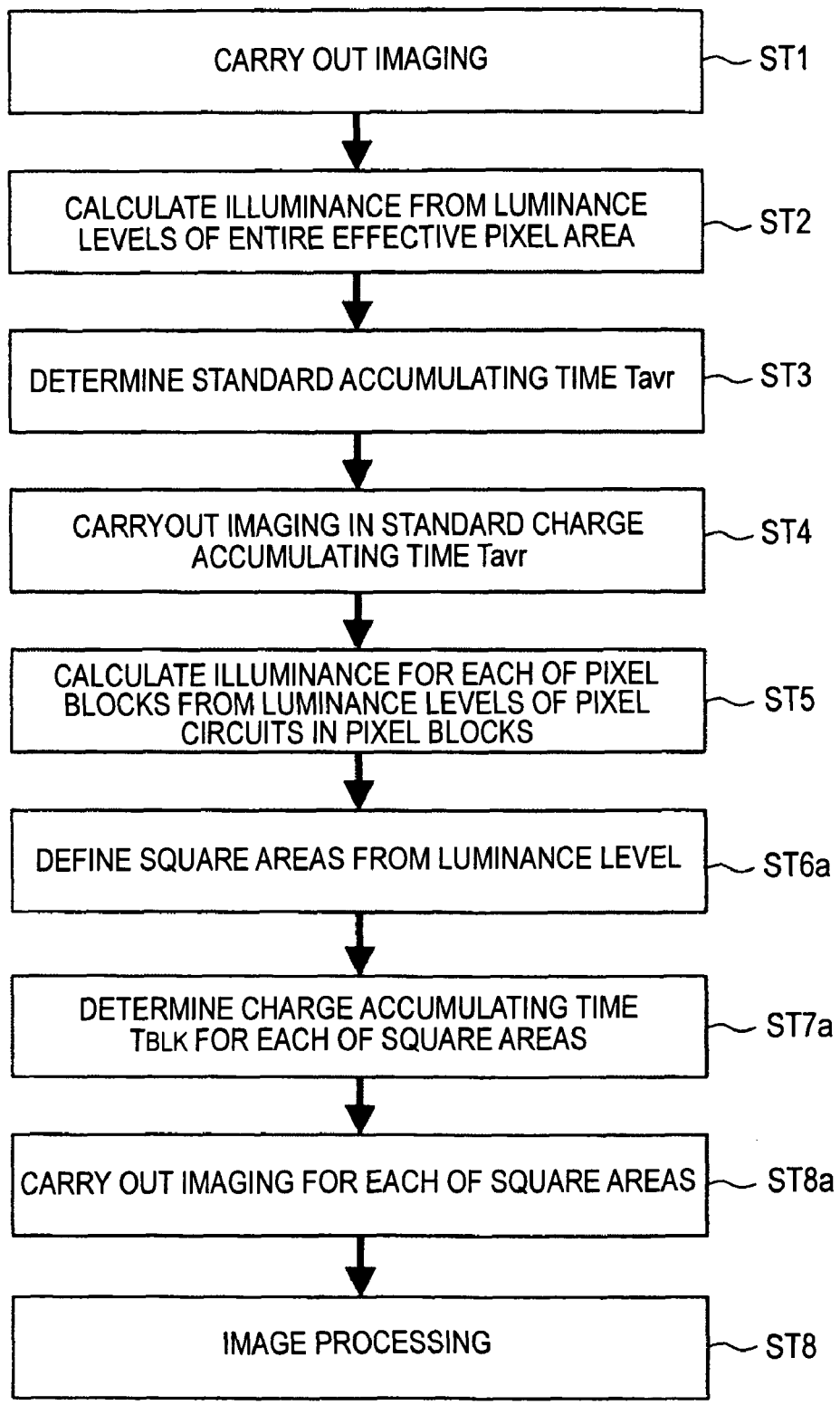
FIG. 17 is a flowchart of an operation example of the camera according to the second embodiment.

FIG. 17 is a flowchart of the operation example of the camera according to the second embodiment.

As shown in FIG. 17, after the processing in steps ST1 to ST5 (see FIG. 9), the next steps ST6a and ST7a are executed.

Step ST6a

In step ST6a, the square areas ARA are defined.

The square-area defining unit 324 defines the square areas ARA on the basis of the average $<Y_{BLK}>$ of the luminance levels for each of the pixel blocks BLK input from the illuminance acquiring unit 322 and the average $<Y>$ of the luminance levels over the entire effective pixel area 101.

Step ST7a

The charge-accumulating-time determining unit 323 collates the average $<Y_{BLK}>$ of the luminance levels input from the illuminance acquiring unit 322 with the second preset chart and determines the charge accumulating time $T_{BLK}$ for each of the square areas ARA.

Processing same as that in step ST7 in the first embodiment is executed on the pixel blocks BLK other than the square areas ARA. The charge accumulating time $T_{BLK}$ for each of the pixel blocks BLK is determined.

Step ST8a

Processing same as that in step ST7 in the first embodiment is also executed on the square areas ARA. In the pixel blocks BLK in the square areas ARA, the reset and the readout of charges are executed in the allocated same charge accumulating time $T_{BLK}$.

The reset and the readout of charges are also executed on the pixel blocks BLK other than the square areas ARA in the allocated charge accumulating time $T_{BLK}$.

Step ST8

Thereafter, image processing same as that in step ST8 in the first embodiment is executed.

According to the second embodiment, since the exposure control can be executed for each of the square areas ARA, it is possible to reduce a transfer data amount.

In a monitoring camera, a large amount of information is more important than the beauty of a picture. The camera according to this embodiment can change exposure of a specific area without changing a frame rate and the like. When abnormality occurs during monitoring, the camera can change exposure only in an area in which the abnormality occurs such that an image in the area is clear. Therefore, the camera is suitable for an application such as the monitoring camera.

Third Embodiment

For improvement of an aperture ratio, it is desirable to reduce the number of divisions of blocks in a row direction such that one pixel block BLK is formed by as many pixel circuits 11 as possible. It is important to determine how to secure optical uniformity of the pixel circuits 11 while securing areas for forming the switch circuits SW and the pixel block selection signal lines BSL.

In a third embodiment of the present invention, the aperture ratio is improved by dispersing the switch circuits SW and the pixel block selection signal lines BSL.

Figure 18:
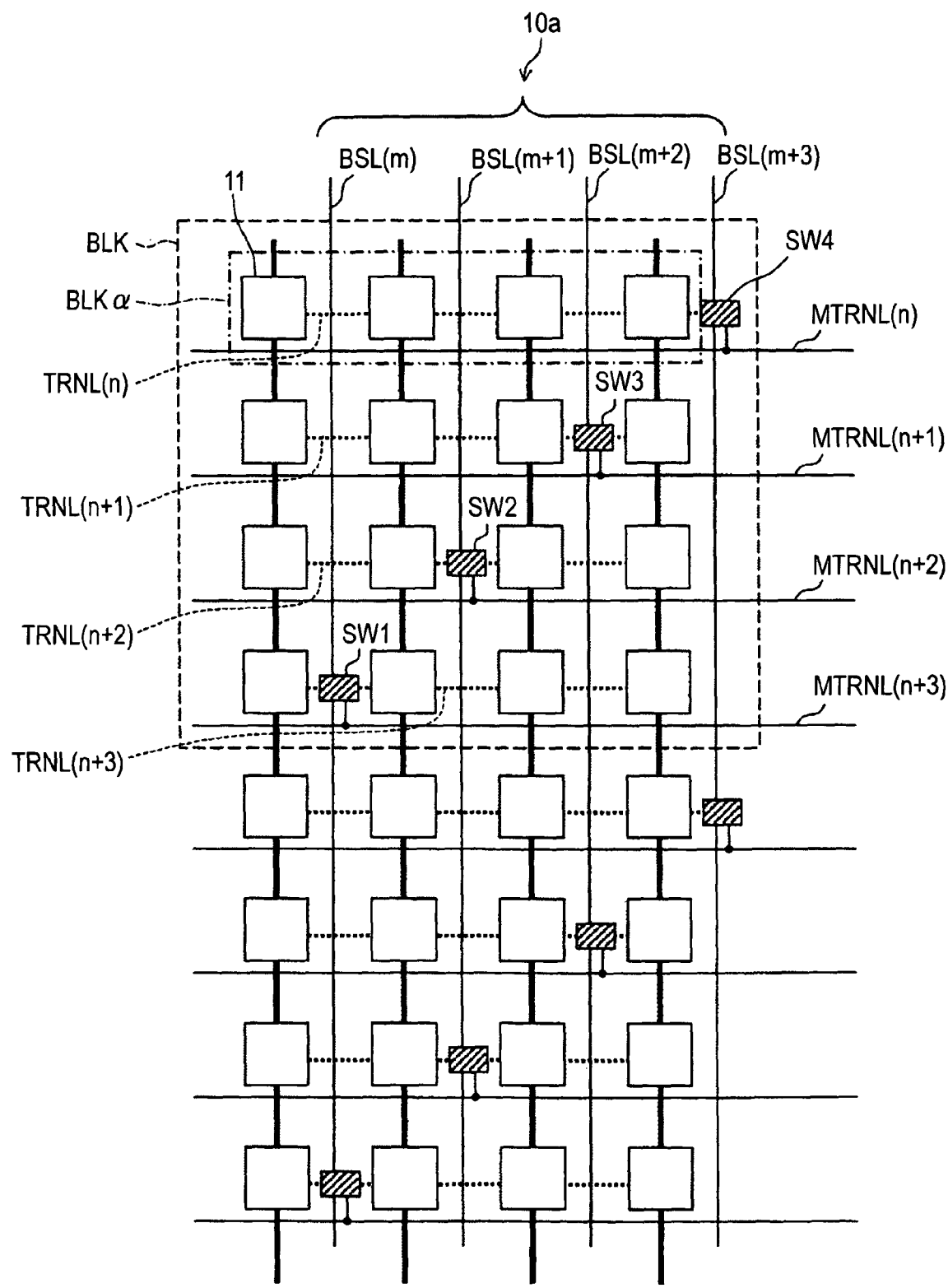
FIG. 18 is a detailed block diagram of a configuration example of a pixel unit according to a third embodiment of the present invention.

FIG. 18 is a detailed block diagram of a configuration example of a pixel unit according to the third embodiment. In FIG. 18, only a part of a pixel unit 10a is shown and components such as the reset signal lines RSTL and the row selection circuit are omitted as appropriate.

As shown in FIG. 18, in the effective pixel area 101 of the pixel unit 10a, the pixel block BLK is formed by 4×4 pixel circuits 11. The small pixel block BLKα is formed by four pixel circuits 11 continuous in the row direction.

In the first embodiment, the switch circuits SW in the column direction are connected to the common pixel block selection signal line BSL(l) (see FIG. 3). On the other hand, in the third embodiment, switch circuits SW1 to SW4 are arranged to shift one column for each row.

In order to control the pixel circuits 11 in one small pixel block BLKα, it is necessary to connect one pixel block selection signal line BSL and the main transfer signal line MTRNL to the switch circuit SW.

Therefore, four pixel block selection signal lines BSL(m) to BSL(m+3) are connected to the switch circuits SW1 to SW4, respectively. The number of pixel block selection signal lines BSL(m) is the same as the number of pixel circuits 11 in the row direction in the pixel block BLK.

One ends of the pixel block selection signal lines BSL are connected to the reset control circuit 17.

Figure 19:
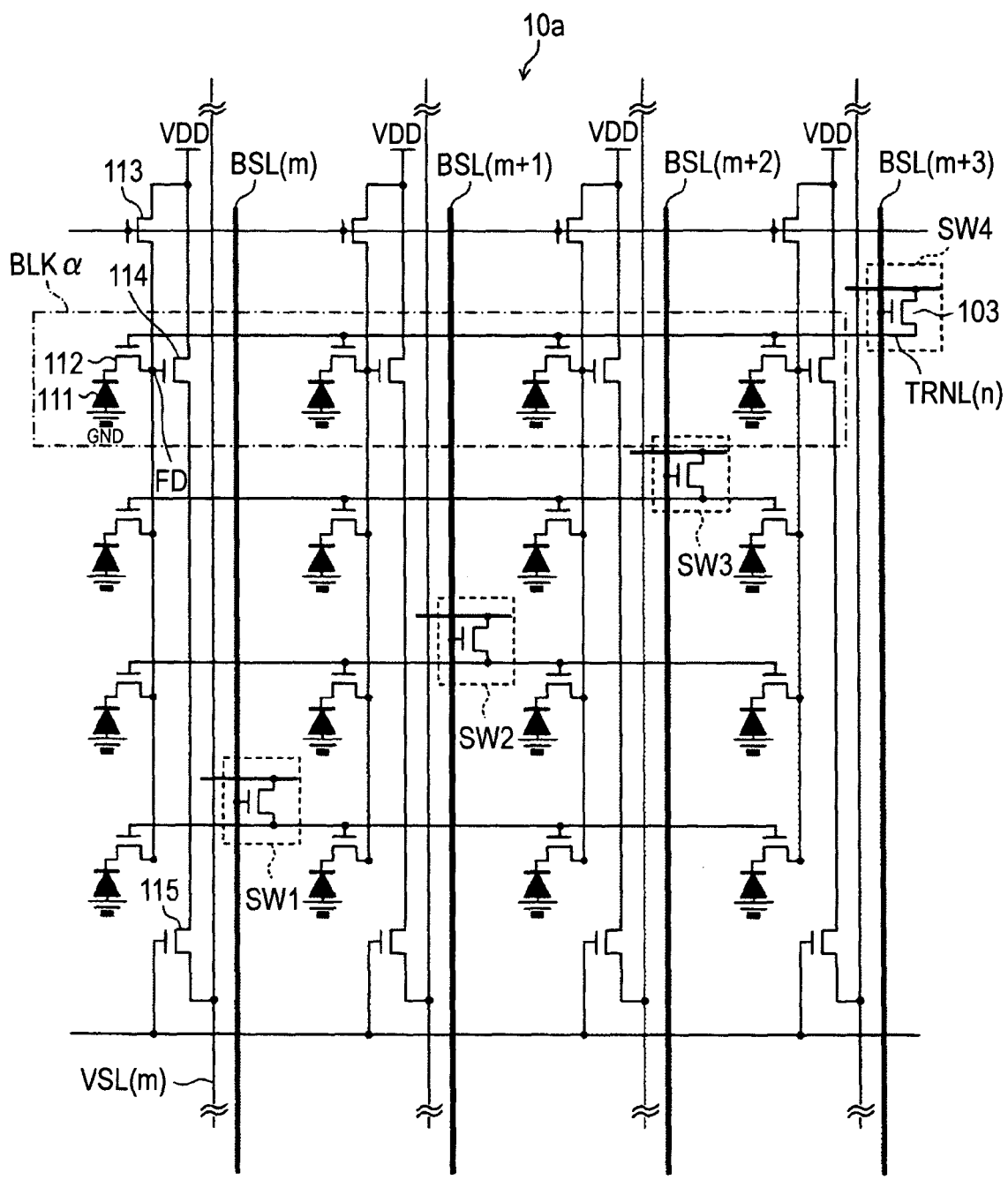
FIG. 19 is an equivalent circuit diagram of the pixel unit shown in FIG. 18.

FIG. 19 is an equivalent circuit diagram of the pixel unit shown in FIG. 18. In FIG. 19, as in FIG. 18, only a part of the pixel unit 10a is shown and components such as the reset signal lines RSTL and the row selection circuits are omitted as appropriate.

In the pixel circuit 11 shown in FIG. 19, four photoelectric conversion elements 111 in the column direction share one floating diffusion FD, one reset transistor 113, one amplification transistor 114, and one selection transistor 115.

More specifically, anode sides of the four photoelectric conversion elements 111 in the column direction are grounded (GND) and cathode sides thereof are connected to the sources of the transfer transistors 112, respectively.

Drains of four transfer transistors 112 in the column direction are connected in common to the floating diffusion FD. A source of the one reset transistor 113 and a gate of the one amplification transistor 114 are also connected to the floating diffusion FD.

The switch circuits SW1 to SW4 include the transistors 103 serving as switches. Gates of the transistors 103 of the switch circuits SW1 to SW4 are connected to the pixel block selection signal lines BSL(m), sources thereof are connected to the transfer signal lines TRNL(n), and drains thereof are connected to the main transfer signal lines MTRNL(n).

On the other hand, the light blocking area 102 is divided in a unit of four rows in the row direction. In the light blocking area 102, as in the configuration shown in FIG. 18, concerning the column direction, the four photoelectric conversion elements 111 share the transistors other than the transfer transistors 112.

A control method for the pixel unit 10a shown in FIG. 19 is the same as that in the first embodiment. The reset control is executed for each of the pixel blocks BLK.

The reset control circuit 17 supplies the pulse-like pixel block selection signal SBS to four pixel block selection signal lines BSL(m) to BSL(m+3). The row directing circuit 13 supplies the pulse-like main driving signal SMTRN to the main transfer signal lines MTRNL(n).

Consequently, the transistors 103 of the switch circuits SW1 to SW4 change to the ON state. The row driving circuit 13 supplies the pulse-like reset signal SRST to the reset signal lines RSTL(n) as appropriate, whereby the reset control is executed.

It is also possible to provide the square areas ARA shown in FIG. 15 in the pixel unit 10a and executes the reset control for each of the square areas ARA.

According to the third embodiment, arrangement shapes of the switch circuits SW and the respective signal lines such as the pixel block selection signals BSL are uniformalized. The respective pixel circuits can obtain optical uniformity.

In recent years, a back-illuminated CMOS image sensor attracts attention in which, after circuits are stacked on a semiconductor substrate, a silicon layer of the semiconductor substrate is reduced in thickness by polishing. In the back-illuminated CMOS image sensor, since light is made incident from the rear surface of the semiconductor substrate, the light does not affect nonuniformity of wiring patterns of an upper wiring layer.

By applying this pixel unit to the back-illuminated CMOS image sensor, it is possible to realize a flexible layout because the switch circuits SW and the pixel block selection signal lines BSL are not restricted by forming places and the like.

A computer program executed by a camera mounted with the CMOS image sensor according to the first to third embodiments can be executed by accessing a recording medium such as a semiconductor memory, a magnetic disk, an optical disk, or a floppy (registered trademark) disk using a computer in which the recording medium is set.

The present application contains subject matter related to that disclosed in Japanese Priority Patent Application JP 2008-178964 filed in the Japan Patent Office on Jul. 9, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
plural pixel blocks with a predetermined number of pixel circuits of respective pixel blocks set as one unit, the pixel blocks being obtained by dividing a pixel area formed by arraying plural pixel circuits, which convert incident light into charges according to photoelectric conversion, in a matrix shape; and
a selection control unit that selects desired ones of the pixel blocks and collectively executes reset control for discharging charges accumulated by the respective pixel circuits in the selected pixel blocks, wherein
the selection control unit changes timing for executing the reset control for each of the selected pixel blocks and allocates different charge accumulating times to the pixel circuits,
the selection control unit adjusts the charge accumulating times based on illuminance calculated from luminance levels of each of the pixel blocks,
the pixel circuits respectively include transfer switches for transferring accumulated charges to predetermined nodes,
the selection control unit includes, one for each of the pixel blocks, switch circuits for executing reset control on the pixel circuit in the selected pixel block,
the switch circuits are arranged in the same column and connected to first and second control lines for controlling states of the switch circuits to be on or off, and
the selection control unit simultaneously switches, on the basis of a first control signal supplied to the first control line and a second control signal supplied to the second control line, all the transfer switches of the pixel circuits in the pixel blocks, and
each of the pixel blocks is formed by N×N (N=2, 3, . . .) pieces of the pixel circuits such that the pixel block is formed in a substantial regular square shape.

2. An imaging device according to claim 1, wherein
the first control line is divided into N lines, and
the selection control unit supplies the first control signal to the N first control lines and collectively executes reset control for the pixel circuits in the pixel blocks.

3. An imaging device according to any one of claims 2, wherein
the pixel area includes a light blocking area for blocking the incident light, and
the pixel blocks are formed in line units in the light blocking area.

4. An imaging device according to any one of claims 2, wherein
the pixel area includes a light blocking area for blocking the incident light, and
the selection control unit allocates, to the light blocking area, longest charge accumulating time among the charge accumulating times to be allocated.

5. A camera comprising:
an imaging device;
an optical system that guides incident light to a pixel area of the imaging device;
a control unit that controls the imaging device; and
a signal processing unit that processes an output signal output by the imaging device on the basis of the control, wherein
the imaging device includes:
plural pixel blocks with a predetermined number of pixel circuits of respective pixel blocks set as one unit, the pixel blocks being obtained by dividing a pixel area formed by arraying plural pixel circuits, which convert incident light into charges according to photoelectric conversion, in a matrix shape; and
a selection control unit that selects desired ones of the pixel blocks and collectively executes reset control for discharging charges accumulated by the respective pixel circuits in the selected pixel blocks,
the selection control unit changes timing for executing the reset control for each of the selected pixel blocks and allocates different charge accumulating times to the pixel circuits,
the selection control unit adjusts the charge accumulating times based on illuminance calculated from luminance levels of each of the pixel blocks,
the pixel circuits respectively include transfer switches for transferring accumulated charges to predetermined nodes,
the selection control unit includes, one for each of the pixel blocks switch circuits for executing reset control on the pixel circuit in the selected pixel block, the switch circuits are arranged in the same column and connected to first and second control lines for controlling states of the switch circuits to be on or off, the selection control unit simultaneously switches, on the basis of a first control signal supplied to the first control line and a second control signal supplied to the second control line all the transfer switches of the pixel circuits in the pixel blocks, and each of the pixel blocks is formed by N×N (N=2, 3, . . .) pieces of the pixel circuits such that the pixel block is formed in a substantial regular square shape.

6. A control method for an imaging device comprising the steps of:

dividing a pixel area into a plurality of pixel blocks with a predetermined number of pixel circuits, the pixel circuits being arranged in a matrix shape and configured to convert incident light into charges according to photoelectric conversion, each of the pixel blocks being formed by N×N (N=2, 3, . . .) pieces of the pixel circuits such that the pixel block is formed in a substantial regular square shape;

selecting desired ones of the pixel blocks among the plurality of pixel blocks with a predetermined number of pixel circuits of the respective pixel blocks set as one unit; and collectively executing reset control for discharging charges accumulated by the respective pixel circuits in the selected pixel blocks, wherein in the step of collectively executing the reset control, timing for executing the reset control is changed for each of the selected pixel blocks and different charge accumulating times are allocated to the pixel circuits, and in the step of collectively executing the reset control, switch circuits are used, one for each of the pixel blocks, for executing reset control on the pixel circuit in the selected pixel block, the switch circuits being arranged in the same column and connected to first and second control lines for controlling states of the switch circuits to be on or off, the step of collectively executing the reset control including simultaneously switching, on the basis of a first control signal supplied to the first control line and a second control signal supplied to the second control line, all the transfer switches of the pixel circuits in the pixel blocks.

7. A computer program product comprising a tangible non-transitory computer-readable storage medium having program instructions stored thereon, the program instructions being for execution by a computer of the control method for an imaging device according to claim 6.

8. An imaging device comprising:

plural pixel blocks with a predetermined number of pixel circuits of respective pixel blocks set as one unit, the pixel blocks being obtained by dividing a pixel area formed by arraying plural pixel circuits, which convert incident light into charges according to photoelectric conversion, in a matrix shape; and a selection control unit that selects desired ones of the pixel blocks and collectively executes reset control for discharging charges accumulated by the respective pixel circuits in the selected pixel blocks, wherein the selection control unit changes timing for executing the reset control for each of the selected pixel blocks and allocates different charge accumulating times to the pixel circuits, the selection control unit adjusts the charge accumulating times based on illuminance calculated from luminance levels of each of the pixel blocks, the pixel circuits respectively include transfer switches for transferring accumulated charges to predetermined nodes, the selection control unit includes, one for each of the pixel blocks, switch circuits for executing reset control on the pixel circuit in the selected pixel block, the switch circuits are connected to first and second control lines for controlling states of the switch circuits to be on or off, and the selection control unit simultaneously switches, on the basis of a first control signal supplied to the first control line and a second control signal supplied to the second control line, all the transfer switches of the pixel circuits in the pixel blocks, and each of the pixel blocks is formed by N×N (N=2, 3, . . .) pieces of the pixel circuits such that the pixel block is formed in a substantial regular square shape, the first control line is divided into N lines, the reset control circuits are dispersed in different positions for each row in the same pixel blocks and connected to any one of the divided first control lines, and the selection control unit supplies the first control signal to the N first control lines and collectively executes reset control for the pixel circuits in the pixel blocks.

* * * * *